United States Patent
Dave

(10) Patent No.: US 10,685,483 B2
(45) Date of Patent: Jun. 16, 2020

(54) MULTI-VIEWPOINT TRANSFORMATION MODULE FOR USE IN 3D RENDERING SYSTEM

(71) Applicant: Imagination Technologies Limited, Kings Langley (GB)

(72) Inventor: Jairaj Dave, Hemel Hempstead (GB)

(73) Assignee: Imagination Technologies Limited, Kings Langley (GB)

( * ) Notice: Subject to any disclaimer, the term of this patent is extended or adjusted under 35 U.S.C. 154(b) by 36 days.

(21) Appl. No.: 16/025,059

(22) Filed: Jul. 2, 2018

(65) Prior Publication Data
US 2019/0005720 A1    Jan. 3, 2019

(30) Foreign Application Priority Data
Jun. 30, 2017    (GB) .................................. 1710510.7

(51) Int. Cl.
| | |
|---|---|
| *G06T 15/00* | (2011.01) |
| *G06T 17/10* | (2006.01) |
| *G06F 30/327* | (2020.01) |
| *G06T 15/20* | (2011.01) |
| *G09G 5/14* | (2006.01) |
| *G06F 119/18* | (2020.01) |
| *G06T 15/40* | (2011.01) |

(52) U.S. Cl.
CPC ............ *G06T 17/10* (2013.01); *G06F 30/327* (2020.01); *G06T 15/005* (2013.01); *G06T 15/20* (2013.01); *G09G 5/14* (2013.01); *G06F 2119/18* (2020.01); *G06T 15/405* (2013.01)

(58) Field of Classification Search
CPC ....... G06T 15/20; G06T 15/005; G06T 17/10; G09G 5/14
See application file for complete search history.

(56) References Cited

U.S. PATENT DOCUMENTS

| | | |
|---|---|---|
| 2014/0267260 A1 | 9/2014 | Hakura et al. |
| 2015/0049104 A1 | 2/2015 | Lum et al. |
| 2016/0217760 A1 | 7/2016 | Chu et al. |
| 2018/0190021 A1* | 7/2018 | Bhiravabhatla ......... G06T 15/20 |

FOREIGN PATENT DOCUMENTS

WO    2008/147561 A2    12/2008

* cited by examiner

*Primary Examiner* — Charles Tseng
(74) *Attorney, Agent, or Firm* — Potomac Law Group, PLLC; Vincent M DeLuca

(57) ABSTRACT

Viewport transformation modules for use in a three-dimensional rendering system wherein vertices are received from an application in a strip. The viewport transformation modules include a fetch module configured to read from a vertex buffer: untransformed coordinate data for a vertex in a strip; information identifying a viewport associated with the vertex; and information identifying a viewport associated with one or more other vertices in the strip. The one or more other vertices in the strip are selected based on a provoking vertex of a primitive to be formed by the vertices in the strip and a number of vertices in the primitive. The viewport transformation modules also include a processing module that performs a viewport transformation on the untransformed coordinate data based on each of the identified viewports to generate transformed coordinate data for each identified viewport; and a write module that writes the transformed coordinate data for each identified viewport to the vertex buffer.

19 Claims, 15 Drawing Sheets

| | Column | | | | |
|---|---|---|---|---|---|
| | 3 | 2 | 1 | 0 | |
| | TX0 | TY0 | TZ0 | TW0 | 0 |
| | TX1 | TY1 | TZ1 | TW1 | 1 |
| | TX2 | TY2 | TZ2 | TW2 | 2 |
| | TX2 | TY3 | TZ3 | TW3 | 3 |
| 904 | NULL3 | NULL2 | NULL1 | NULL0 | 4 |
| | X3 | X2 | X1 | X0 | 5 |
| | Y3 | Y2 | Y1 | Y0 | 6 |
| | Z3 | Z2 | Z1 | Z0 | 7 |
| 906 | W3 | W2 | W1 | W0 | 8 |
| | VPT ID 3 | VPT ID 2 | VPT ID 1 | VPT ID 0 | 29 |
| 908 | | | | | |

FIG. 10

| | Column | | | | | |
|---|---|---|---|---|---|---|
| | 3 | 2 | 1 | 0 | | |
| 0 | TX0.A | TY0.A | TZ0.A | TW0.A | 0 | |
| 1 | TX0.B | TY0.B | TZ0.B | TW0.B | 1 | |
| 2 | TX0.C | TY0.C | TZ0.C | TW0.C | 2 | |
| | NULL | NULL | NULL | NULL | 3 | |
| | NULL3 | NULL2 | NULL1 | NULL0 | 4 | |
| | X3 | X2 | X1 | X0 | 5 | Row |
| | Y3 | Y2 | Y1 | Y0 | 6 | |
| | Z3 | Z2 | Z1 | Z0 | 7 | |
| | W3 | W2 | W1 | W0 | 8 | |
| | VPT ID 3 | VPT ID 2 | VPT ID 1 | VPT ID 0 | 29 | |

MULTI-VIEWPOINT TRANSFORMATION MODULE FOR USE IN 3D RENDERING SYSTEM

BACKGROUND OF THE INVENTION

A three-dimensional (3D) graphics system (which also may be referred to herein as a rendering system) is designed to render an image of a 3D scene on a two-dimensional (2D) screen. Specifically, an application (e.g. a video game) generates a 3D model of the scene and outputs geometry data representing the objects in the scene. In particular, the application divides each object into a plurality of primitives (i.e. simple geometric shapes, such as triangles, lines and points) which are defined by the positions of one or more vertices. The geometry data output by the application includes information identifying each vertex (e.g. the coordinates of the vertex) and information indicating the primitives formed by the vertices. The graphics system then converts the received geometry data into an image displayed on the screen.

A 3D graphics system typically has two main stages—a geometry processing stage and a rasterization stage. During the geometry processing stage the vertices received from the application are transformed from a world window 102 (i.e. world space coordinates) to a viewport 104 (i.e. screen space coordinates) as shown in FIG. 1A, which is referred to herein as a viewport transformation. The world window 102 is the area of the scene 106 in application-specific coordinates (e.g. kilometres, or centimetres) that the user wants to visualize. In contrast, the viewport 104 is an area of the screen 108 in rendering-device specific coordinates (e.g. pixels or sampling positions) used to display the image of the scene. The viewport 104 may be the whole screen 108 or a portion thereof. Accordingly, the viewport transformation translates the incoming world space coordinates in the world window 102 to screen space coordinates in the viewport 104.

In many cases (e.g. as shown in FIG. 1A), the geometry processing stage uses a single viewport (typically with dimensions that cover the entire screen) at a time and the coordinates of all vertices are transformed to this viewport. However, some applications (such as, but not limited to, geometry shaders) may use multiple viewports to achieve one or more visual effects. For example, in some cases it may be desirable to render to a smaller window within the screen and/or to multiple windows within the screen. In other examples, some applications may implement layered rendering wherein specific primitives may be sent to different layers (each associated with a different viewport) of a layered framebuffer to, for example, implement cube-based shadow mapping. For example, as shown in FIG. 1B there may be two viewports 110 and 112 in the screen 108 and a first and second primitive 114 and 116 are rendered in the first viewport 110 and a third primitive 118 is rendered in the second viewport 112 In these cases, the geometry data output by the application may include information indicating the viewport associated with each primitive which allows the coordinates of vertices of different primitives to be mapped to different viewports. The geometry processing stage also typically includes forming primitives from the received vertices, prior to, or after, the viewport transformations thereof.

During the rasterization stage the primitives are mapped to pixels and the colour of each pixel is determined. This may comprise identifying which primitive(s) are visible at each pixel. The colour of each pixel may then be determined by the texture of the visible primitive(s) at that pixel and/or the pixel shader program run on that pixel. A pixel shader program describes operations that are to be performed for given pixels. Once a colour value has been identified for each pixel the colour values are written out to a frame buffer in memory and then displayed on the screen.

The embodiments described below are provided by way of example only and are not limiting of implementations which solve any or all of the disadvantages of known viewport transformation systems.

SUMMARY OF THE INVENTION

This summary is provided to introduce a selection of concepts that are further described below in the detailed description. This summary is not intended to identify key features or essential features of the claimed subject matter, nor is it intended to be used to limit the scope of the claimed subject matter.

Described herein are viewport transformation modules and methods for use in a three-dimensional rendering system that supports the use of multiple viewports. The viewport transformation modules include a fetch module configured to read from a vertex buffer: untransformed coordinate data for a vertex in a strip; information identifying a viewport associated with the vertex; and information identifying a viewport associated with one or more other vertices in the strip. The one or more other vertices in the strip are selected based on a provoking vertex of a primitive to be formed by the vertices in the strip and the number of vertices in the primitive. The viewport transformation modules also include a processing module that performs a viewport transformation on the untransformed coordinate data based on each of the identified viewports to generate transformed coordinate data for each identified viewport; and a write module that writes the transformed coordinate data for each identified viewport to the vertex buffer.

A first aspect provides a viewport transformation module for use in a three-dimensional rendering system, the viewport transformation module comprising: a fetch module configured to read from a vertex buffer: untransformed coordinate data for a vertex in a strip; information identifying a viewport associated with the vertex; and information identifying a viewport associated with at least one other vertex in the strip, the at least one other vertex selected based on a provoking vertex of a primitive to be formed by the vertices in the strip and a number of vertices in the primitive; a processing module configured to perform a viewport transformation on the untransformed coordinate data based on each of the identified viewports to generate transformed coordinate data for each identified viewport; and a write module configured to write the transformed coordinate data for each identified viewport to the vertex buffer.

A second aspect provides a method of performing multi-viewport transformations on a vertex in a vertex strip, the method comprising: fetching, at a viewport transformation module, untransformed coordinate data for the vertex from a vertex buffer; fetching, at the viewport transformation module, information identifying a viewport associated with the vertex; fetching, at the viewport transformation module, information identifying a viewport associated with at least one other vertex in the strip, the at least one other vertex selected based on a provoking vertex of a primitive to be formed by the vertices in the strip and a number of vertices in the primitive; performing, at the viewport transformation module, a viewport transformation on the untransformed coordinate data based on each of the identified viewports to generate transformed coordinate data for each identified viewport; and write the transformed coordinate data for each identified viewport to the vertex buffer.

A third aspect provides a viewport transformation module for use in a three-dimensional rendering system, the viewport transformation module comprising: a processing module configured to perform a viewport transformation on untransformed coordinate data for a vertex in a strip for each of a plurality of viewports to generate transformed coordinate data for each of the plurality of viewports, the plurality of viewports comprising a viewport associated with the vertex and a viewport associated with at least one other vertex in the strip, the at least one other vertex based on a provoking vertex of a primitive to be formed by the vertices in the strip and a number of vertices in the primitive; and; a write module configured to write the transformed coordinate data to a vertex buffer so that the transformed coordinate data is stored in the vertex buffer in an order that corresponds to an order of the vertices in the strip associated with the plurality of viewports.

A fourth aspect provides a method of performing multi-viewport transformations on vertices in a strip comprising: performing a viewport transformation on untransformed coordinate data for a vertex in a strip for each of a plurality of viewports to generate transformed coordinate data for each of the plurality of viewports, the plurality of viewports comprising a viewport associated with the vertex and a viewport associated with at least one other vertex in the strip, the at least one other vertex based on a provoking vertex of a primitive to be formed by the vertices in the strip and a number of vertices in the primitive; and writing the transformed coordinate data to a vertex buffer so that the transformed coordinate data is stored in the vertex buffer in an order that corresponds to an order of the vertices in the strip associated with the plurality of viewports.

The viewport transformation module may be embodied in hardware on an integrated circuit. There may be provided a method of manufacturing, at an integrated circuit manufacturing system, the viewport transformation module. There may be provided an integrated circuit definition dataset that, when processed in an integrated circuit manufacturing system, configures the system to manufacture the viewport transformation module. There may be provided a non-transitory computer readable storage medium having stored thereon a computer readable description of the viewport transformation module that, when processed in an integrated circuit manufacturing system, causes the integrated circuit manufacturing system to manufacture an integrated circuit embodying the viewport transformation module.

There may be provided an integrated circuit manufacturing system comprising: a non-transitory computer readable storage medium having stored thereon a computer readable description of the viewport transformation module; a layout processing system configured to process the computer readable description so as to generate a circuit layout description of an integrated circuit embodying the viewport transformation module; and an integrated circuit generation system configured to manufacture the viewport transformation module according to the circuit layout description.

There may be provided computer program code for performing a method as described herein. There may be provided non-transitory computer readable storage medium having stored thereon computer readable instructions that, when executed at a computer system, cause the computer system to perform the methods as described herein.

BRIEF DESCRIPTION OF THE DRAWINGS

The present invention is described by way of example with reference to the accompanying drawings. In the drawings:

FIG. 10 is a schematic diagram of an example vertex block of the vertex buffer of FIG. 9 used to store transformed coordinate data for a plurality of vertices at a time;

FIG. 11 is a schematic diagram of the example vertex block of the vertex buffer of FIG. 9 used to stored transformed coordinate data for a single vertex at a time;

DETAILED DESCRIPTION OF THE INVENTION

The following description is presented by way of example to enable a person skilled in the art to make and use the invention. The present invention is not limited to the embodiments described herein and various modifications to the disclosed embodiments will be apparent to those skilled in the art. Embodiments are described by way of example only.

Described herein are methods, systems, and viewport transformation modules for predictively performing a plurality of viewport transformations on the untransformed coordinate data for vertices in a strip in an efficient manner. The methods include fetching, from a vertex buffer: untransformed coordinate data for a vertex in a strip; information identifying the viewport associated with the vertex; and information identifying the viewport associated with at least one other vertex in the strip. The at least one other vertex in the strip is selected based on the provoking vertex for the primitive to be formed from the vertices in the strip and the number of vertices in the primitive. A transformation is then performed on the untransformed coordinate data for each identified viewport to generate transformed coordinate data for each identified viewport. The transformed coordinate data is then written to the vertex buffer.

As is described in more detail below, the vertex transformation that is performed on a vertex is based on the primitive that the vertex forms part of. Specifically, each primitive is associated with a viewport to which the vertices that form that primitive are transformed to. Since the vertices of a strip may each form part of a plurality of primitives a plurality of different viewport transformations may need to be performed for each vertex. Specifically, if the viewports associated with the different primitives that a vertex forms part of are different then multiple viewport transformations will have to be performed on that vertex. However, the viewports associated with the different primitives may be the same and thus only one transform may have to be performed. Accordingly, a 3D rendering system could be configured to assemble the primitives, determine the viewport associated with the primitives and then perform the least number of transformations for each vertex. However, this requires that the primitives be formed prior to the viewport transformations. The methods, systems and viewport transformation modules described herein provide an efficient way to generate transformed vertex data for vertices in a strip when the primitives are formed after viewport transformation by predicting the primitives each vertex will form part of, and performing a transformation for each primitive the vertex is predicted to form part of (regardless of whether the viewport transformations are the same for different primitives). In other words, the methods, systems and viewport transformation modules described herein assume the viewport for each primitive the vertex is predicted to form part of is different.

Figure 1A:
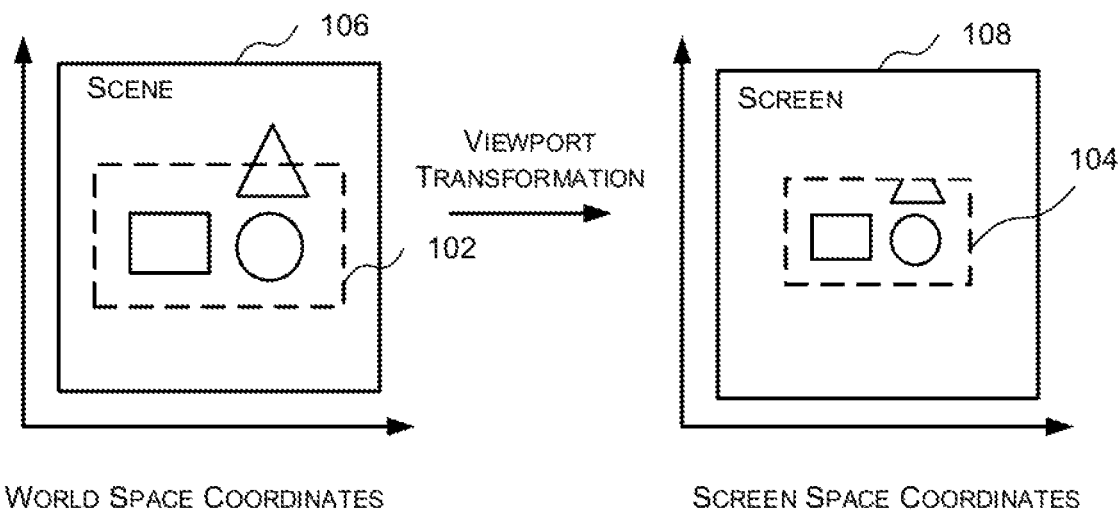
FIG. 1A is a schematic diagram of a window and a viewport.
Figure 1B:
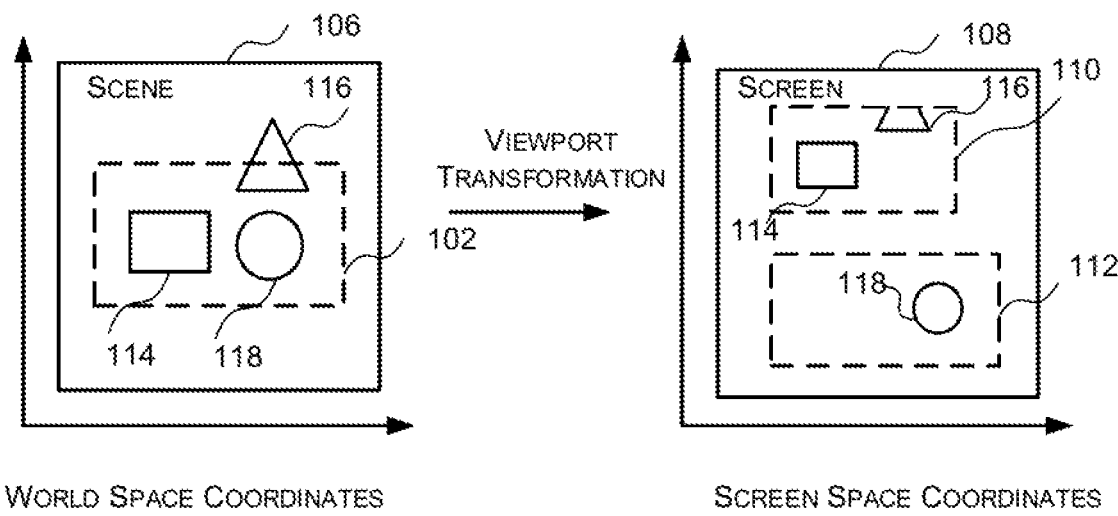
FIG. 1B is a schematic diagram of multiple viewports.
Figure 2:
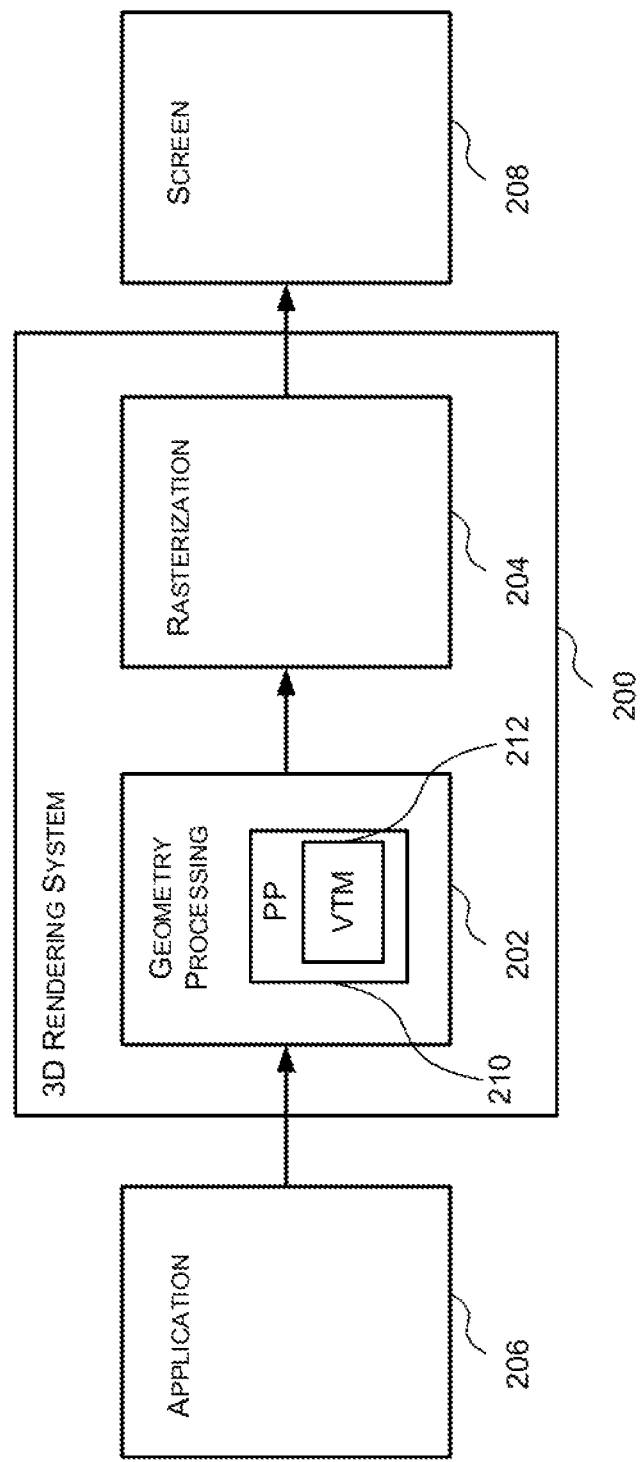
FIG. 2 is a block diagram of an example 3D rendering system comprising a primitive processing module.

Reference is first made to FIG. 2 which illustrates an example 3D rendering system 200 in which the viewport transformation modules described herein may be implemented. The 3D rendering system is designed to render an image of a 3D scene. It will be appreciated that FIG. 2 only shows some elements of a 3D rendering system and that there may be many other elements within the 3D rendering system that are not shown in FIG. 2. The 3D rendering system 200 comprises a geometry processing block 202 and a rasterization block 204.

The geometry processing block 202 receives geometry data from an application 206 and outputs a set of screen primitives (e.g. simple geometric shapes, such as triangles on the screen 208). The geometry data comprises information identifying a plurality of vertices (e.g. the coordinates of each vertex in world space coordinates), information identifying the primitives formed by the vertices, and information (e.g. a viewport ID) identifying a viewport associated with each primitive. The geometry processing block 202 comprises a primitive processing (PP) block 210 that is configured to transform, using a viewport transformation module (VTM) 212, the received vertices from a world window (i.e. world space coordinates) to a viewport (i.e. screen space coordinates) which is referred to herein as a viewport transformation. The world window is the area the user wants to visualize in application-specific coordinates (e.g. kilometres, or centimetres). In contrast, the viewport is an area of the screen in rendering-device specific coordinates (e.g. pixels) used to display the image of the scene. The viewport may encompass the whole screen or a portion thereof.

Viewport transformations are typically performed on a per primitive basis (i.e. all the vertices that form a particular primitive are viewport transformed in the same manner (e.g. transformed to the same viewport)). Many viewport transformation modules in known PP blocks are configured to support a single viewport and perform a single viewport transformation on each primitive (and thus each vertex that forms the primitive) based on that viewport. However, the viewport transformation modules described herein support multiple viewports to implement certain visual effects, such as, reflections. Accordingly, in the viewport transformation modules described herein different viewports may be assigned or allocated to different primitives and thus multiple viewport transformations based on different viewports may be performed on vertices of different primitives. The number of different viewports that are supported is device specific. In some cases, 16 different viewports are supported, but it will be evident to a person of skill in the art that this is an example only. Where a vertex can form part of multiple primitives this may result in multiple viewport transformations being performed on the same vertex. This is particularly likely to occur if the vertices are transmitted by the application 206 to the geometry processing block 202 as a strip.

Figure 3:
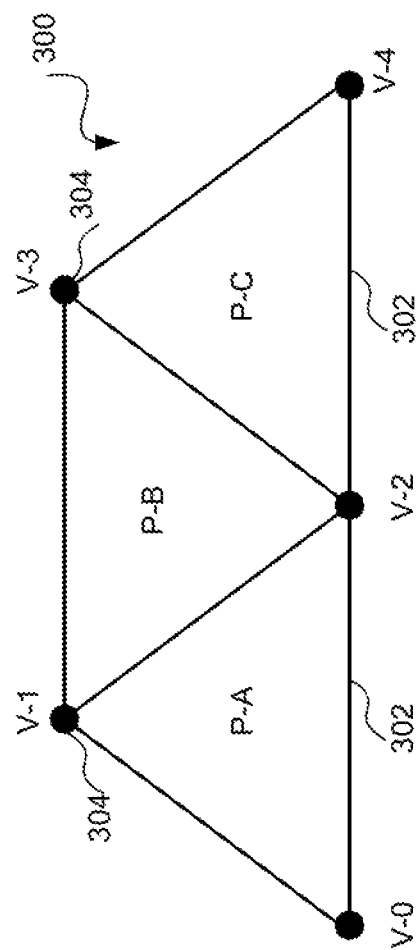
FIG. 3 is a schematic diagram of a first example triangle strip.

A strip of primitives is a series of primitives sharing vertices. For example, FIG. 3 shows an example triangle strip 300 comprising a series of primitives (triangles) 302 sharing vertices 304. Strips of primitives are typically used to reduce the amount of data used to define a set of primitives instead of sending vertex data for each primitive separately. For example, a triangle strip reduces the number of vertices to transmit from 3X to X+2 where X is the number of triangles to be drawn.

The viewport target, and thus the viewport transformation to be performed, for a vertex is defined by the primitive(s) to which it belongs. Since the vertices of a strip can form part of multiple primitives a single vertex may have multiple different viewport targets. For example, in FIG. 3 vertex 2 (V-2) forms part of primitive A (P-A), primitive B (P-B) and primitive C (P-C) thus vertex 2 (V-2) may have three different viewport targets.

Accordingly, the viewport transformation modules 212 described herein are configured to perform N viewport transformations on the received vertices for each vertex in a strip in an efficient manner where N is the number of vertices in a primitive.

Returning to FIG. 2, the PP block 210 is also configured to form screen space primitives (i.e. primitives defined by vertices in screen space coordinates) from the transformed coordinate data which are forwarded to the rasterization block 204 for processing. An example primitive processing block will be described below with reference to FIG. 4.

The rasterization block 204 is configured to receive the screen space primitives generated by the geometry processing block 202 and to determine which primitive(s) is/are visible at each pixel and subsequently determine the colour of each pixel. Since more than one primitive can overlap the same pixel a depth comparison (e.g. z-buffering or depth buffering) is performed for each pixel to determine which primitive is visible. For example, a z-buffer (which also may be referred to as a depth buffer) may be used to store the distance of each pixel to the nearest primitive in the scene. Then if a subsequent primitive of the scene overlaps the same pixel the depth of the new primitive is compared to the stored depth and if the new primitive has a depth indicating it is closer to the pixel then the z-buffer is updated with the new depth value.

Once depth values for a set of geometry have been compared with the depth values in the z-buffer, a colour value associated with the closest primitive is identified for each pixel. The colour of each pixel may be determined by the texture that covers that pixel and/or the pixel shader program run on that pixel. A pixel shader program describes the operations to be applied to pixels. Once a colour value has been identified for each pixel the colour values are written out to a frame buffer in memory and then displayed on the screen 208.

Figure 4:
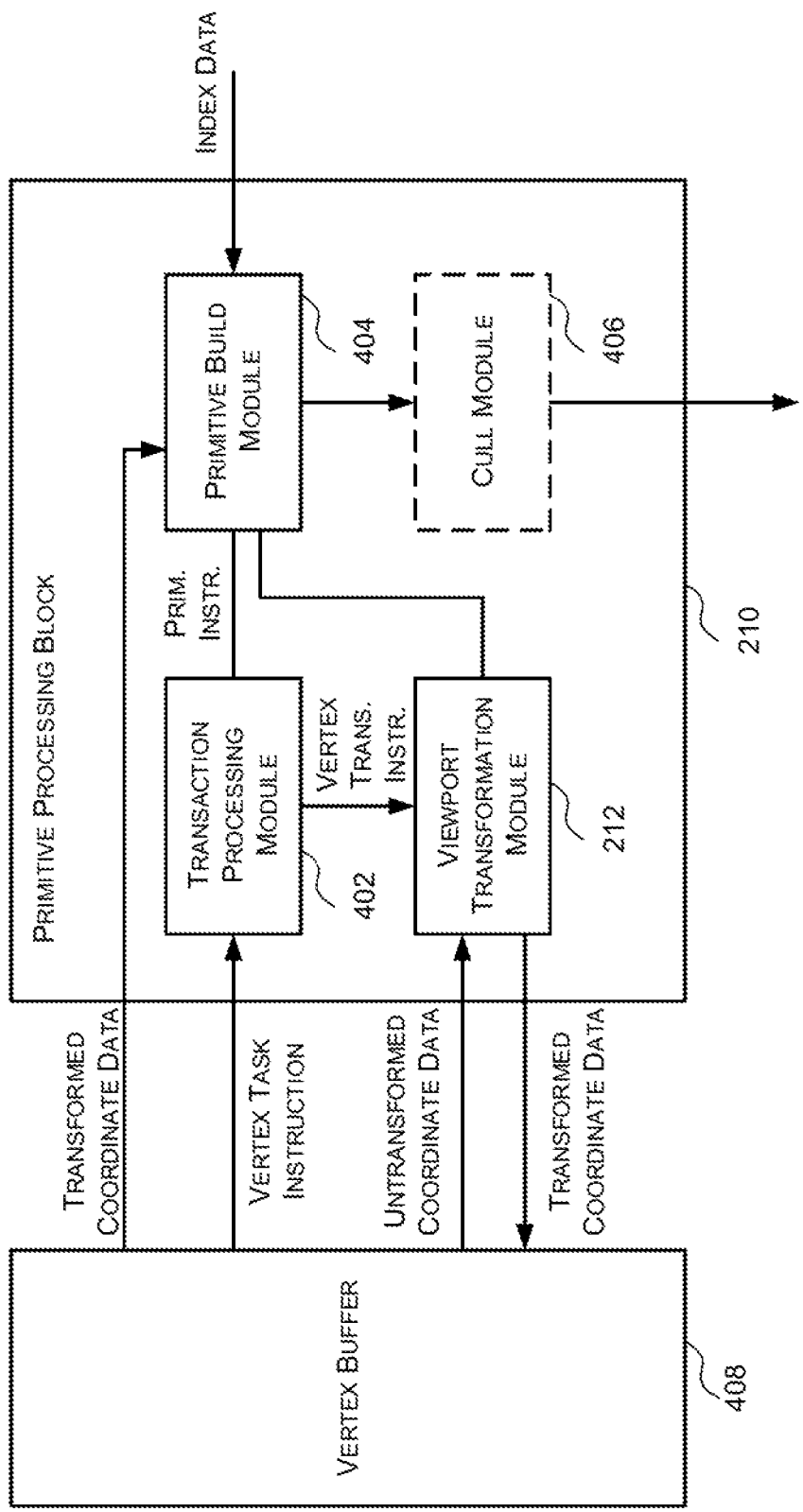
FIG. 4 is a block diagram of an example primitive processing module of FIG. 2.

Reference is now made to FIG. 4 which illustrates an example implementation of a primitive processing block 210 in which the viewport transformation modules described herein may be implemented. As described above, the primitive processing (PP) block 210 is configured to perform viewport transformations on the vertices generated by the application 206 to convert the vertices from world window (i.e. world space coordinates) to a viewport (i.e. screen space coordinates); and, form screen primitives from the transformed vertices. The PP block 210 of FIG. 4 comprises a transaction processing module 402, a viewport transformation module 212, and a primitive build module 404. In some cases, the PP block 210 may also comprise a cull module 406.

The vertex data received from the application 206 is stored in a vertex buffer 408. The vertex data typically comprises, for each vertex, vertex coordinates (e.g. X, Y, Z and W) in world coordinates (which is referred to as the untransformed coordinate data) and other vertex information (such as, but not limited to, information (e.g. viewport ID) indicating the viewport the vertex is associated with). The vertex data is stored in the vertex buffer 408 in vertex tasks which groups multiple vertices together. In some examples, a vertex task may comprise all vertices in a strip (e.g. a triangle strip). Each task and each vertex within a task are individually addressable in the vertex buffer 408. An example structure of the vertex buffer 408 will be described below in reference to FIGS. 9 to 11.

The vertex buffer 408 sends vertex task instructions to the transaction processing module 402 to cause the PP block 210 to process the vertices associated with a particular task, and keeps track of which tasks have been completed (e.g. processed by the PP block 210). A vertex task instruction may specify, for example, the base address in the vertex buffer 408 of the task to be processed, the number of vertices in the task, and a task ID (e.g. a task number).

The transaction processing module 402 is configured, in response to receiving a vertex task instruction, to translate the vertex task instruction into a set of viewport transformation instructions which are sent to the viewport transformation module 212, and a primitive instruction which is sent to the primitive build module 404. The viewport transformation instructions cause the viewport transformation module 212 to perform a plurality of viewport transformations on vertices in the task.

Figure 5:
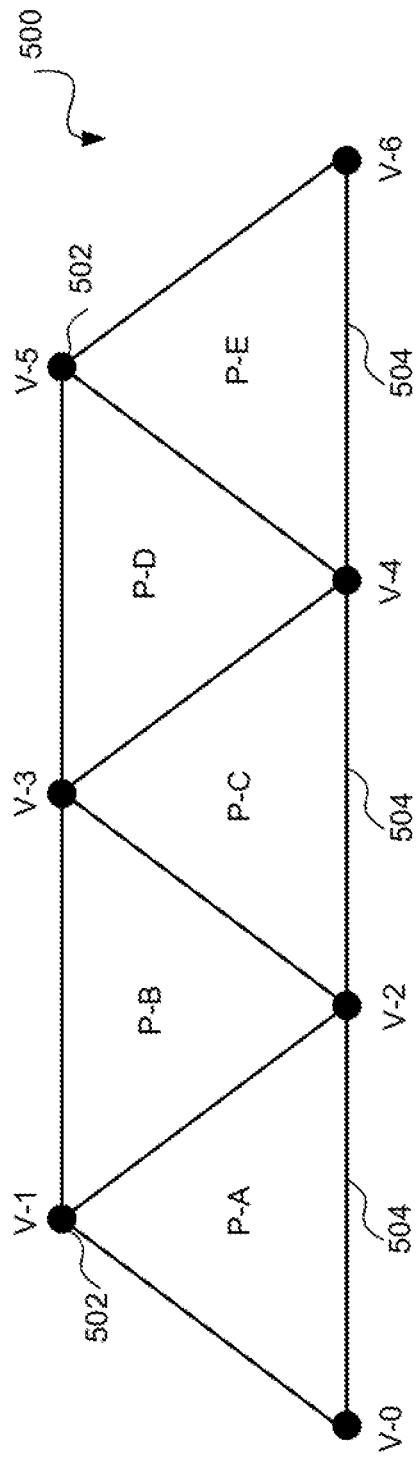
FIG. 5 is a schematic diagram of a second example triangle strip with different provoking vertices.

Multiple viewport transformations are performed on the vertices in the task because when the application 206 is configured to output vertices as a strip, each vertex may form part of multiple primitives (e.g. triangles). For example, FIG. 5 illustrates a triangle strip 500 with seven vertices (V-0 to V-6) 502 and five primitives (P-A to P-E) 504 formed thereby. Three of the vertices 502 in the strip 500 (V-2, V-3, and V-4) form part of three primitives 504 (e.g. triangles). Specifically, vertex 2 (V-2) forms part of primitives A, B and C; vertex 3 (V-3) forms part of primitives B, C and D; and vertex 4 (V-4) forms part of primitives C, D and E. Since viewport transformations are performed on a per primitive basis—i.e. all vertices that form a primitive are transformed to the same viewport—a vertex that forms part of three different primitives may have to be viewport transformed to three different viewports, one for each primitive.

The viewport transformations performed on the vertices in the task can be determined from the provoking vertex of the primitives. Specifically, in systems where the application 206 is configured to assign each vertex its own viewport (which may be identified by a viewport ID) one of the vertices of the primitive will be the definitive, or master, vertex of the viewport transformation, which will be referred to herein as the provoking vertex. It is the viewport associated with the provoking vertex of a primitive that controls the viewport transformation of that primitive.

For example, where the primitives are triangles each primitive is formed by three vertices—a leading vertex (which may be referred to as vertex 0 of the primitive), a middle vertex (which may be referred to as vertex 1 of the primitive), and a trailing vertex (which may be referred to as vertex 2 of the primitive). For example, for primitive C (P-C) of FIG. 5, vertex 2 (V-2) is the leading vertex, vertex 3 (V-3) is the middle vertex, and vertex 4 (V-4) is the trailing vertex. One of the leading vertex, the middle vertex, and the trailing vertex of the primitive will be the provoking vertex.

Where the leading vertex is the provoking vertex (i.e. the provoking vertex is 0) then the first vertex of the primitive will dictate the viewport transformation for that primitive. For example, as shown in table 506 when the provoking vertex is the leading vertex (i.e. the provoking vertex is 0) then the provoking vertex for primitives A, B, C, D and E will be vertices 0, 1, 2, 3, and 4 respectively. Where the middle vertex is the provoking vertex (i.e. the provoking vertex is vertex 1 of the primitive) then the second vertex of the primitive will dictate the viewport transformation for that primitive. For example, as shown in table 508 when the provoking vertex is the middle vertex (i.e. the provoking vertex is 1) then the provoking vertex for primitives A, B, C, D and E will be vertices 1, 2, 3, 4, and 5 respectively. Finally, where the trailing vertex is the provoking vertex (i.e. the provoking vertex is vertex 2 of the primitive) then the third vertex of the primitive will dictate the viewport transformation for that primitive. For example, as shown in table 510 when the provoking vertex is the trailing vertex (i.e. the provoking vertex is 2) then the provoking vertex for primitives A, B, C, D and E will be vertices 2, 3, 4 and 5 respectively.

When a vertex (such as vertex 2 (V-2)) forms part of three different primitives then the vertex will be the leading vertex for one primitive, the middle vertex of another primitive, and the trailing vertex for yet another primitive. For example, vertex 2 (V-2) is the trailing vertex of primitive A (P-A), the middle vertex of primitive B (P-B) and the leading vertex of primitive C (P-C). The viewport transformations that are performed by the viewport transformation module 212 are the viewport transformations that correspond to the vertex in each of the different primitive positions. The viewport that is used when the vertex is in each of these positions will be dependent on the provoking vertex.

Specifically, if the provoking vertex is 0 (i.e. the leading vertex is the provoking vertex) then when the current vertex is a trailing vertex the relevant viewport will be the viewport associated with the vertex two vertices before the current vertex in the triangle strip; when the current vertex is a middle vertex then the relevant viewport is the viewport associated with the vertex immediately preceding the current vertex in the triangle strip; and when the current vertex is the leading vertex then the relevant viewport is the viewport associated with the current vertex. For example, with reference to table 506 of FIG. 5 when vertex 2 (V-2) is the trailing vertex in primitive A (P-A) the viewport associated with vertex 0 (V-0) will be used for the transformation; when vertex 2 (V-2) is the middle vertex in primitive B (P-B) the viewport associated with vertex 1 will be used for the transformation; and when vertex 2 (V-2) is the leading vertex in primitive C (P-C) the viewport associated with vertex 2 (V-2) will be used for the transformation. Accordingly, when the provoking vertex is 0 (i.e. the leading vertex is the provoking vertex), the relevant viewports for the viewport transformations will be the viewports associated with the current vertex and the two preceding vertices in the strip.

If the provoking vertex is 1 (i.e. the middle vertex is the provoking vertex) then when the current vertex is a trailing vertex then the relevant viewport will be the viewport associated with the vertex immediately preceding the current vertex in the triangle strip; when the current vertex is a middle vertex then the relevant viewport will be the viewport associated with the current vertex; and when the current vertex is the leading vertex then the relevant viewport will be the viewport associated with the viewport immediately following the current vertex in the triangle strip. For example, with reference to table 508 of FIG. 5 when vertex 2 (V-2) is the trailing vertex in primitive A (P-A) the viewport associated with vertex 1 (V-1) will be used; when vertex 2 (V-2) is the middle vertex in primitive B (P-B) the viewport associated with vertex 2 (V-2) will be used; and when vertex 2 (V-2) is the leading vertex in primitive C (P-C) the viewport associated with vertex 3 (V-3) will be used. Accordingly, when the provoking vertex is 1 (i.e. the middle vertex is the provoking vertex), the relevant viewports will be those viewports associated with the current vertex and the vertices immediately preceding and immediately following the current vertex in the strip.

If the provoking vertex is 2 (i.e. the trailing vertex is the provoking vertex) then when the current vertex is a trailing vertex then the relevant viewport will be the viewport associated with the current vertex; when the current vertex is a middle vertex then the relevant viewport will be the viewport associated with the vertex immediately following the current vertex in the triangle strip; and when the current vertex is the leading vertex then the relevant viewport will be the viewport associated with the vertex that is two vertices after the current vertex in the triangle strip. For example, with reference to table 510 of FIG. 5 when vertex 2 (V-2) is the trailing vertex in primitive A (P-A) the viewport associated with the current vertex will be used; when vertex 2 (V-2) is the middle vertex in primitive B (P-B) the viewport associated with vertex 3 (V-3) will be used; and when vertex 2 (V-2) is the leading vertex in primitive C (P-C) the viewport associated with vertex 4 (V-4) will be used. Accordingly, when the provoking vertex is 1 (i.e. the middle vertex is the provoking vertex), the relevant viewports will be those viewports associated with the current vertex and the two following vertices in the strip.

Accordingly, in the examples described herein the viewport transformation module 212 is configured to perform multiple viewport transformations on each vertex in a task based on the provoking vertex. For example, where the primitives are triangles the viewport transformation module 212 may be configured to: perform viewport transformations on the current vertex based on the viewports associated with the current vertex and two immediately preceding vertices when the provoking vertex is the leading vertex; perform viewport transformations on the current vertex based on the viewports associated with the current vertex, the immediately preceding vertex and the immediately following vertex when the provoking vertex is the middle vertex; and perform viewport transformations on the current vertex based on the viewports associated with the current vertex and the two vertices immediately following the current vertex when the provoking vertex is the trailing vertex.

Returning to FIG. 4, in some cases, the transaction processing module 402 may be configured to send a single viewport transformation instruction to the viewport transformation module 212 for each vertex in the task that causes the viewport transformation module 212 to perform multiple viewport transformations on that vertex. Such a viewport transformation instruction may comprise, for example, information indicating the location of the vertex data in the vertex buffer 408 (e.g. a base address for the vertex). In some cases, the transaction processing module 402 may be configured to determine, from the provoking vertex, the relevant viewports to use for the viewport transformations. In these cases, the viewport transformation instruction may also include information indicating the relevant viewports to be used for the transformations (e.g. the address of the relevant viewports). Where the viewport transformation instruction does not include information indicating the viewports to be used in the transformations, the viewport transformation module 212 itself may be configured to determine, from the provoking vertex, the relevant viewports to use for the transformations.

However, in other cases, the transaction processing module 402 may be configured to send a viewport transformation instruction to the viewport transformation module 212 for each viewport transformation to be performed. In these cases, the transaction processing module 402 may be configured to determine, from the provoking vertex information, the appropriate viewports to be used for the viewport transformations for each vertex in a received task and send N viewport transformation instructions to the viewport transformation module 212—one for each viewport transformation to be performed. The viewport transformation instructions in these cases may include information indicating the location of the vertex in the vertex buffer 408 (e.g. a base address for the vertex), and information identifying the viewport to be used for the transformation (e.g. an address of the viewport ID in the vertex buffer 408).

The viewport transformation module 212 is configured, for each vertex in the task, to fetch the untransformed coordinate data (e.g. normalised X, Y, Z and W coordinates in world space) from the vertex buffer 408, fetch information from the vertex buffer 408 identifying the viewport associated with that vertex, and fetch information from the vertex buffer 408 identifying the viewport associated with at least one other vertex in the strip (based on the provoking vertex information). The viewport transformation module 212 then performs a viewport transformation on the untransformed coordinate data for each identified viewport to generate transformed coordinate data (e.g. X, Y, Z and W in screen space) for each identified viewport. The viewport transformation module 212 then writes the transformed coordinate data (e.g. X, Y Z and W in screen space) for each identified viewport to the vertex buffer 408 for subsequent retrieval by the primitive build module 404 in order to form primitives therefrom.

In some cases, which will be described below with reference to FIGS. 12 to 13, the viewport transformation module 212 may be configured to write the transformed coordinate data to the vertex buffer 408 so that the transformed coordinate data for a primitive can be obtained from the same location in the vertex buffer 408, regardless of the provoking vertex. An example method for generating transformed coordinate data for a vertex is described below with reference to FIG. 6. An example implementation of a viewport transformation module 212 is described below with reference to FIG. 8.

The primitive build module 404 is configured to generate primitives from the transformed coordinate data stored in the vertex buffer 408. The primitive build module 404 may receive a primitive instruction from the transaction processing module 402 that provides details of the next task to be processed by the primitive build module 404. Once the primitive build module 404 has received a primitive instruction the primitive build module 404 waits for a signal or instruction from the viewport transformation module 212 indicating that the vertices of the task have been transformed; and for index data from an external module. The index data comprises information indicating how the vertices relate to each other to form primitives (e.g. the index data may indicate the leading, middle and trailing vertex of each primitive).

Once the signal or instruction has been received from the viewport transformation module 212 indicating that the vertices of the task have been transformed, and the index data has been received, the primitive build module 404 obtains the transformed coordinate data from the vertex buffer 408 and assembles the transformed coordinate data into primitives in accordance with the index data. Specifically, the primitive build module 404 identifies, from the index data, the vertices that form each primitive, and the relationship between those vertices (e.g. the position of the vertices in the primitive—for example, which is the leading vertex, which is the middle vertex, and which is the trailing vertex). The primitive build module 404 then retrieves, for each primitive, the transformed coordinate data from the vertex buffer 408 for each vertex that corresponds to the vertex in the relevant position of that primitive.

As described above, the viewport transformation module 212 is configured to perform, for each vertex, a viewport transformation for the vertex in each of the possible positions in a primitive. For example, where the primitive is a triangle a viewport transformation is performed for the vertex as the leading vertex of a primitive, a viewport transformation is performed for the vertex as the middle vertex of a primitive, and a viewport transformation is performed for the vertex as the trailing vertex of a primitive. The primitive build module obtains, for each vertex, in a primitive the transformed coordinate data from the vertex buffer 408 that corresponds to that vertex in the position of that primitive; and, then forms the primitive from that transformed coordinate data.

For example, if the primitives are triangles and the index data indicates that there is a primitive formed by vertices C, D and E where C is the leading vertex, D is the middle vertex and E is the trailing vertex the vertex buffer 408 will comprise three sets of transformed coordinate data for each of vertices C, D and E—one set that corresponds to the vertex as the leading vertex, one set that corresponds to the vertex as the middle vertex, and one set that corresponds to the vertex as the trailing vertex. In this example, to form the C, D, E primitive the primitive build module obtains (e.g. fetches): the transformed coordinate data in the vertex buffer 408 for vertex C that corresponds to vertex C as the leading vertex, the transformed coordinate data in the vertex buffer 408 for vertex D that corresponds to vertex D as the middle vertex, and the transformed coordinate data for vertex E that corresponds to vertex E as the trailing vertex.

The primitive build module then groups that data together to form a primitive. In particular, the primitive build module allocates or maps an index in the index data to each set of transformed coordinate data (i.e. each vertex) of the primitive and links those indices together to form a primitive. Accordingly, where a vertex is viewport transformed three different times that vertex will be mapped to three different indices. In some cases, the primitive build module may also be configured to convert the transformed coordinate data from one format to another (e.g. from 32-bit floating point values to 16.8 fixed point values).

Although the primitive build module 404 has been described above as receiving index data from an external module that indicates how the vertices relate to each other to form primitives, in other examples, the primitive build module 404 may not receive index data. In these examples, since the vertices are in a strip, the primitive build module 404 may be configured to (i) identify the primitives from the order of the vertices in the strip and (ii) generate (as opposed to map) an index for each set of transformed coordinate data (i.e. each vertex) of the primitives.

Once the primitives have been assembled the primitive build module 404 outputs the primitives for further processing.

In some case the PP block 210 may also comprise a cull module 406. The cull module 406 is configured to receive the primitives generated by the primitive build module 404 and remove any redundant primitives to reduce the workload on the remaining modules of the geometry processing block 202 and rasterization block 204. There are many different methods that can be used to identify a primitive is redundant and therefore can be removed. The cull module 406 may be configured to identify redundant primitives using any suitable method or combination of methods. For example, in some cases, the cull module 406 may be configured to remove any primitives that: are facing away from the user; are completely off the screen; are fully outside the clipping planes; have bounding boxes that do not cover any sample points; and/or that do not cover any sample points.

Figure 6:
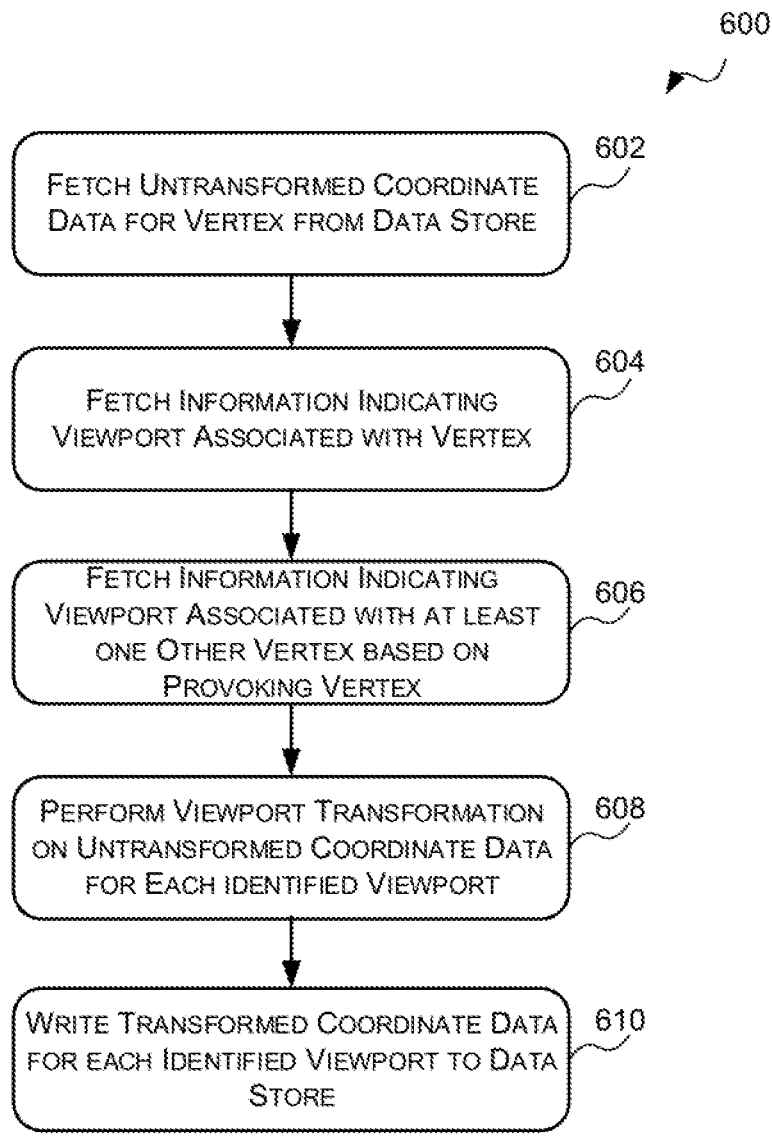
FIG. 6 is a flow diagram of an example method for performing a plurality of viewport transformations on untransformed coordinate data for a vertex in a strip.

Reference is now made to FIG. 6 which illustrates an example method 600 for generating transformed coordinate data for a vertex which may be implemented by the viewport transformation module 212. The method 600 begins at block 602 where the viewport transformation module 212 fetches the untransformed coordinate data for a vertex (i.e. the current vertex) from a data store, such as a vertex buffer 408. In some cases, block 602 may be initiated in response to the viewport transformation module 212 receiving a viewport transformation instruction from the transaction processing module 402. The viewport transformation module may be configured to fetch the untransformed coordinate data from the data store (e.g. vertex buffer 408) by performing a read request of a certain address of the data store. Depending on the size of the untransformed coordinate data the viewport transformation module 212 may be configured to fetch the untransformed coordinate data over several clock cycles. For example, in some cases the viewport transformation module 212 may be configured to request a first coordinate (e.g. X coordinate) in a first clock cycle and request subsequent coordinates (e.g. Y, Z and W) in subsequent clock cycles.

At block 604, the viewport transformation module 212 fetches information from the data store (e.g. vertex buffer 408) that indicates the viewport that the vertex of block 602 (which is referred to herein as the current vertex) is associated with. As described above, it is the application 206 that assigns a viewport to each vertex. In some cases, there will be a fixed number (e.g. 16) of viewports and each of these viewports can be identified by a viewport ID. In these cases, the geometry data that is received from the application typically includes, in addition to the untransformed coordinate data (e.g. the X, Y, X and W coordinate of the vertex in world space) for each vertex, a vertex ID and the viewport transformation module 212 is configured to fetch the viewport ID associated with the current vertex.

At block 606, the viewport transformation module 212 fetches information from the data store (e.g. vertex buffer 408) that indicates the viewport that is associated with at least one other vertex of the strip. Where each vertex is associated with a viewport ID that identifies the viewport that is associated with that vertex, the viewport transformation module 212 may be configured to fetch the viewport ID associated with at least one other vertex from the data store (e.g. vertex buffer 408).

The number of other vertices for which viewport information is fetched is dependent on the number of vertex transformations to be performed on each vertex by the viewport transformation module. As described above, the viewport transformation module is configured to perform one transformation for each possible vertex position in a primitive. Since the number of possible vertex positions (e.g. leading vertex, middle vertex, trailing vertex) in a primitive is equal to the number of vertices in the primitive, if there are N vertices per primitive then there will be N−1 other vertices for which viewport information is fetched. For example, if the primitive is a triangle (N=3) the viewport information for two (N−1) other vertices will be fetched. The vertices for which viewport information is retrieved are referred to herein as the viewport vertices.

The particular viewport vertices are determined from the provoking vertex. As described above, the provoking vertex dictates which vertex in a primitive controls the viewport transformation—i.e. the viewport associated with the provoking vertex is used to perform the viewport transformation. The current vertex will be the provoking vertex when the current vertex is in one of the primitive positions (e.g. when the vertex is the trailing vertex, the middle vertex or the leading vertex). The other viewport vertices are the provoking vertices when the current vertex is in the other primitive positions. For example, if the primitive is a triangle and the provoking vertex is 0 (i.e. the provoking vertex is the leading vertex) then the current vertex is the provoking vertex of the primitive when it is the leading vertex. Viewport information is thus also retrieved for the vertices that are the provoking vertex when the current vertex is the middle vertex of a primitive and the trailing vertex of a primitive. In this example, when the current vertex is the middle vertex of a primitive the provoking vertex will be the vertex immediately preceding the current vertex and when the current vertex is the trailing vertex of a primitive the provoking vertex will be the vertex that is two vertices ahead of the current vertex. Accordingly, in this example the viewport information for the vertex immediately preceding the current vertex and the viewport information for the vertex that is two vertices ahead of the current vertex will be fetched. This is summarized in Table 1 for the case when the primitive is a triangle.

TABLE 1

| Provoking Vertex | Viewport Vertex 0 | Viewport Vertex 1 | Viewport Vertex 2 |
| --- | --- | --- | --- |
| Leading Vertex | Current Vertex | Vertex Preceding Current Vertex by 2 | Vertex Preceding Current Vertex by 1 |
| Middle Vertex | Current Vertex | Vertex Preceding Current Vertex by 1 | Vertex Following Current Vertex by 1 |
| Trailing Vertex | Current Vertex | Vertex Following Current Vertex by 1 | Vertex Following Current Vertex by 2 |

An example method for identifying the viewport vertices when the primitive is a triangle is described below with reference to FIG. 7.

At block 608 the viewport transformation module 212 performs a viewport transformation on the untransformed coordinate data (e.g. X, Y, Z and W in world space coordinates) for each identified viewport to generate transformed coordinate data (e.g. X, Y, Z in screen space coordinate) for each identified viewport.

At block 610, the viewport transformation module 212 writes the transformed coordinate data for each identified viewport to the data store (e.g. vertex buffer 408). As described in more detail below with reference to FIGS. 12 to 13, in some cases the viewport transformation module 212 may be configured to write the transformed coordinate data for the different viewports to the data store (e.g. vertex buffer 408) so that they are stored in a particular order so that the downstream components, such as the primitive build module, can easily retrieve the relevant transformed coordinate data from the data store (e.g. vertex buffer 408). For example, in some cases the viewport transformation module 212 may be configured to write the transformed coordinate data for each identified viewport to the data store (e.g. vertex buffer 408) so that the transformed coordinate data is stored in viewport vertex order.

Although FIG. 6 shows the blocks of method 600 being executed sequentially it will be evident to a person of skill in the art that they may be performed in a different order. For example, it will be evident to a person of skill in the art that blocks 602, 604, and 606 may be executed in any order and may be executed over several cycles. Furthermore, although FIG. 6 illustrates a method in which all viewport transformations are performed on the untransformed coordinate data and then all of the transformed coordinate data sets are written to the data store (e.g. vertex buffer 408), in other examples the viewport transformation module 212 may be configured to write the transformed coordinate data for a particular viewport transformation to the data store (e.g. vertex buffer 408) when that transformed coordinate data is available instead of waiting for all viewport transformations to be complete.

Figure 7:
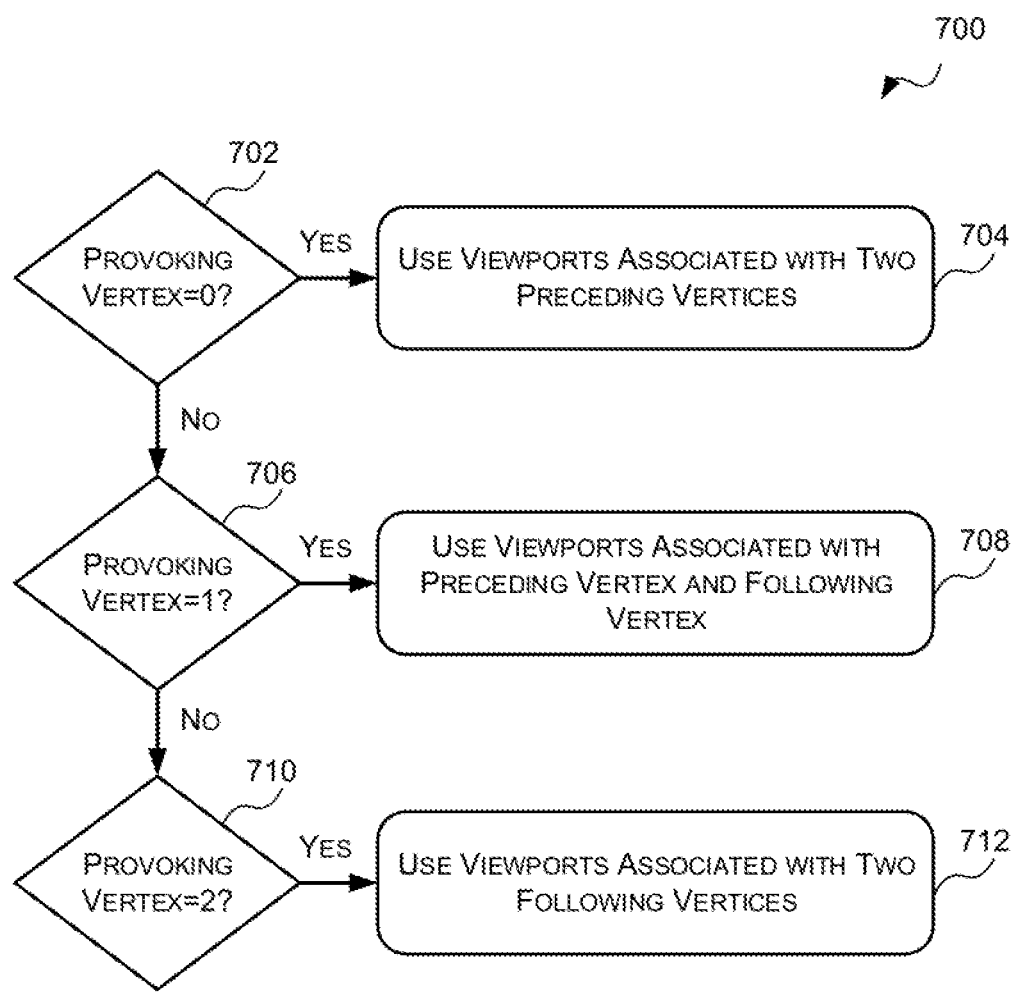
FIG. 7 is a flow diagram of an example method for selecting the other vertices from which the viewport information is obtained.

Reference is now made to FIG. 7 which illustrates an example method 700 for selecting the other viewport vertices (the vertices that supply the viewports to be used in the viewport transformations) that may be implemented by the transaction processing module 402 or the viewport transformation module 212 when the primitives are triangles. When the primitives are triangles there are three vertices per primitive and thus three possible primitive positions for each vertex. As a result, three viewport transformations are performed—one transformation based on the viewport associated with the current vertex and two transformations based on the viewport associated with two other vertices in the strip. The method 700 of FIG. 7 is an example method used to select the two other vertices based on the provoking vertex. As described above, it may be the transaction processing module 402 or the viewport transformation module 212 that is configured to identify the other viewport vertices.

The method 700 begins at block 702 where the transaction processing module 402 or the viewport transformation module 212 determines whether the provoking vertex is 0 (i.e. whether the provoking vertex is the leading vertex of a triangle primitive). If it is determined at block 702 that the provoking vertex is 0 then the method 700 proceeds to block 704 where the viewports associated with the two vertices immediately preceding the current vertex in the strip are selected as the other viewport vertices. This is because, as described above, with reference to FIG. 5, if the provoking vertex is 0 (i.e. if the provoking vertex is the leading vertex) when the current vertex is the trailing vertex the provoking vertex is the vertex that is two vertices ahead of the current vertex, when the current vertex is the middle vertex the provoking vertex is the vertex immediately preceding the current vertex, and when the current vertex is the leading vertex it will be the provoking vertex.

If, however it is determined at block 702 that the provoking vertex is not 0 then the method 700 proceeds to block 706 where the transaction processing module 402 or the viewport transformation module 212 determines whether the provoking vertex is 1 (i.e. whether the provoking vertex is the middle vertex of a triangle primitive). If it is determined at block 706 that the provoking vertex is 1 then the method 700 proceeds to block 708 where the viewports associated with the vertex immediately preceding the current vertex in the strip and the vertex immediately following the current vertex in the strip are selected as the other viewport vertices. This is because, as described above, with reference to FIG. 5, if the provoking vertex is 1 (i.e. if the provoking vertex is the middle vertex) when the current vertex is the trailing vertex the provoking vertex is the vertex that immediately precedes the current vertex in the strip, when the current vertex is the middle vertex the provoking vertex is the current vertex, and when the current vertex is the leading vertex the provoking vertex is the vertex immediately following the current vertex in the strip.

If, however it is determined at block 706 that the provoking vertex is not 1 then the method 700 proceeds to block 710 where the transaction processing module 402 or the viewport transformation module 212 determines whether the provoking vertex is 2 (i.e. whether the provoking vertex is the trailing vertex of a triangle primitive). If it is determined at block 710 that the provoking vertex is 2 then the method 700 proceeds to block 712 where the viewports associated with the two vertices immediately following the current vertex in the strip are selected as the other viewport vertices. This is because, as described above, with reference to FIG. 5, if the provoking vertex is 2 (i.e. if the provoking vertex is the trailing vertex) when the current vertex is the trailing vertex the provoking vertex is the current vertex, when the current vertex is the middle vertex the provoking vertex is the vertex immediately following the current vertex in the strip, and when the current vertex is the leading vertex the provoking vertex is the second vertex following the current vertex in the strip.

Although FIGS. 6-7 describe that N viewport transformations are performed on each vertex in a strip based on the viewports associated with that vertex and the viewports associated one or more vertices preceding and/or following that vertex in the strip. The vertices near the beginning or end of a strip (which will be referred to herein as edge vertices) may not have the required number of vertices preceding or following that vertex in the strip. For example, the first vertex in a strip will not have any preceding vertices in the strip. Accordingly, for the edge vertices in the strip it may not be possible to perform a transformation based on the viewport associated with a preceding and/or following vertex. In some cases, the viewport transformation module may be configured to perform less than N viewport transformations for edge vertices. For example, where the provoking vertex is the leading vertex there are not two vertices preceding this vertex in the strip so only one viewport transformation may be performed, the viewport transformation based on the viewport associated with the vertex. However, in other cases the viewport transformation module may be configured to still perform N viewport transformation modules on the edge vertices and to use a dummy or default viewport for any non-existent preceding or following vertices. Although such transformations are performed the corresponding transformed coordinate data won't be used to form any subsequent vertex thus the actual viewport transformations that are performed are irrelevant. An alternative approach may involve requesting and/or retrieving information identify the viewport associated with one or more vertices that precede and/or follow that strip (for example, where the strip being processed forms part of a larger strip) to enable all N viewport transformations to take place using the correct viewports.

Figure 8:
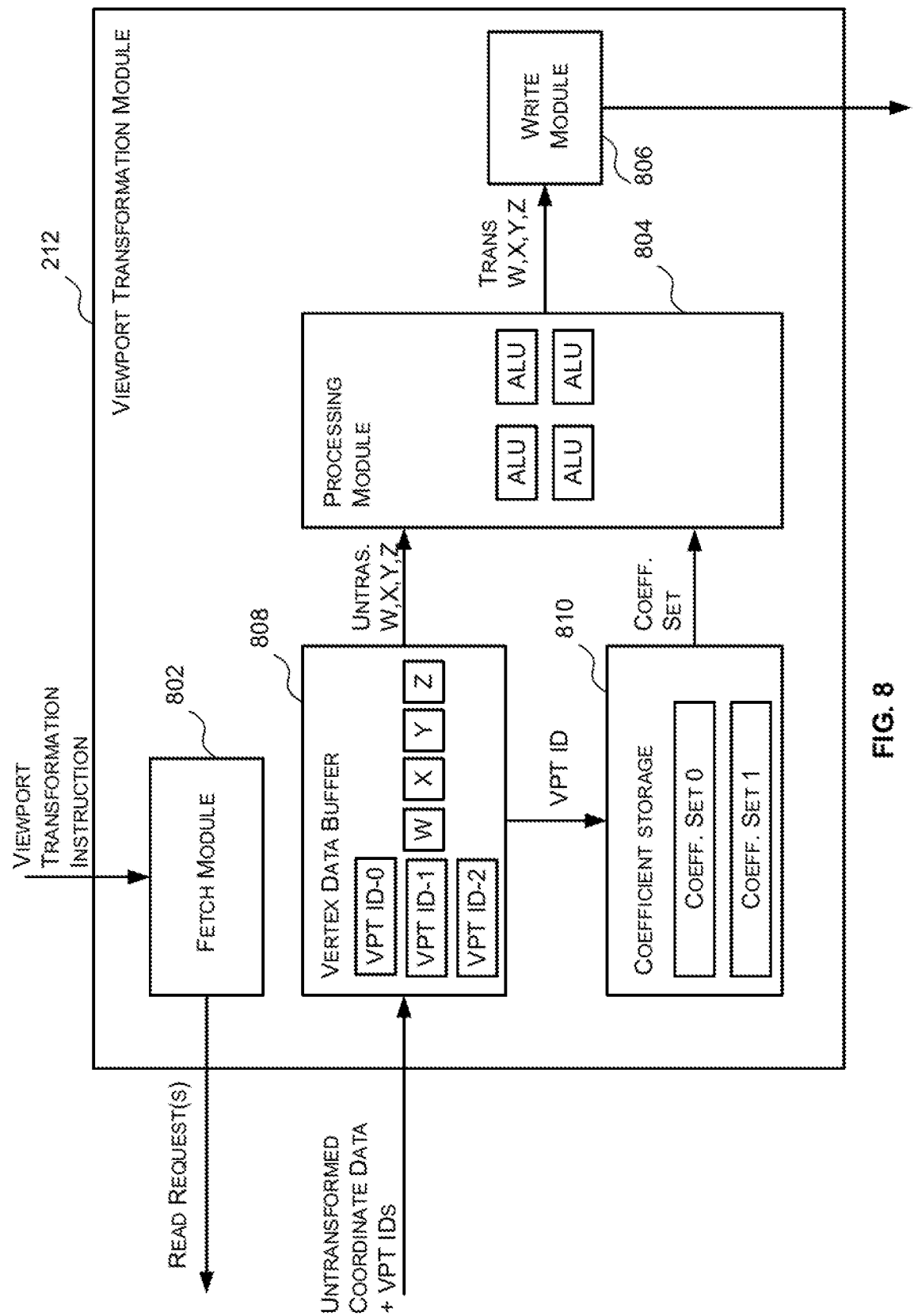
FIG. 8 is a block diagram of an example viewport transformation module.

Reference is now made to FIG. 8 which illustrates an example implementation of a viewport transformation module 212. As described above, the viewport transformation module is configured to perform N viewport transformations on vertices in a strip wherein N is the number of vertices in each primitive. The viewport transformation module 212 of FIG. 8 comprises a fetch module 802, a processing module 804, and a write module 806.

The fetch module 802 is configured to receive viewport transformation instructions (e.g. from the transaction processing module 402) that identify a vertex to be transformed and to fetch the untransformed coordinate data for that vertex from the data store (e.g. vertex buffer 408). In some cases, the viewport transformation instructions comprise an address that identifies the start of the vertex data (e.g. a vertex base address) in the data store (e.g. vertex buffer 408). The vertex data stored for each vertex data typically comprises the untransformed coordinate data (e.g. X, Y, X and W in world space coordinates) and other data (such as the VPT ID). The fetch module 802 determines from the information identifying the start of the vertex data (e.g. the vertex base address) the address of the untransformed coordinate data and sends a read request to the data store (e.g. vertex buffer 408) for the data at that address. Depending on the size of the untransformed coordinate data, the fetch module 802 may be configured to fetch each individual untransformed coordinate separately via individual fetch requests. For example, the fetch module 802 may be configured to request the untransformed X coordinate in a first clock cycle, the untransformed Y coordinate in a second clock cycle and so on.

The fetch module 802 is also configured to fetch (or obtain) information identifying the viewport associated with the vertex to be transformed (which may be referred to herein as the current vertex) from the data store (e.g. vertex buffer 408) and information identifying the viewport associated with N−1 other vertices in the strip from the data store (e.g. vertex buffer 408), wherein N is the number of vertices in a primitive. As described above, each vertex may be assigned (or associated with) a viewport which is identified by a viewport (VPT) ID. The VPT ID is stored in the data store as part of the vertex data for each vertex. In these cases the fetch module 802 may be configured to obtain the VPT ID associated with the vertex to be transformed and the VPT ID of N−1 vertices in the strip which may, for example, comprise sending a read request to the data store (e.g. vertex buffer 408) for each desired VPT ID.

In some cases, the viewport transformation instruction will include information identifying the VPT IDs to obtain and the fetch module 802 simply obtains the identified VPT IDs. For example, the viewport transformation instruction may include the address/location of the data store (e.g. vertex buffer 408) where the relevant VPT ID can be found. In other cases, however, the fetch module 802 or other logic (not shown) in the viewport transformation module 212 may be configured to identify the VPT IDs to be obtained based on the provoking vertex and the number of vertices in each primitive. For example, where the primitives are triangles (i.e. 3 vertices per primitive) the fetch module 802, or other logic of the viewport transformation module 212, may be configured to select the additional VPT IDs to obtain using the method 700 described above with respect to FIG. 7.

In some cases, the VPT IDs fetched (or obtained) from the data store (e.g. vertex buffer 408) may be stored in a cache in association with, for example, the vertex they are associated with and/or the address of the data store (e.g. vertex buffer 408) from which it was fetched. In these cases, when the fetch module 802 wants to fetch (or obtain) the VPT ID associated with a particular vertex, the fetch module 802 may be configured to first see if the VPT ID associated with that particular vertex is in the cache (and thus has already been fetched from the data store (e.g. vertex buffer 408)). Since the VPT IDs associated with most vertices will be used N times this can significantly reduce the number of reads performed on the data store (e.g. vertex buffer 408).

In some cases, the untransformed coordinate data and the information (e.g. VPT ID) identifying the viewport associated with the vertex to be transformed and N−1 other vertices is stored in a vertex data buffer 808 in the order it is to be processed, such as a FIFO (first in first out) buffer until the processing module 804 is ready to perform the viewport transformation of that data. Although FIG. 8 shows a single vertex data buffer 808, in other examples there may be multiple data buffers for storing the untransformed coordinate data. For example, there may be a data buffer for storing the untransformed X, Y and Z coordinates and another data buffer for storing the untransformed W coordinate.

The processing module 804 comprises a series of ALUs (arithmetic logic units) configured to perform a viewport transformation on untransformed coordinate data (e.g. X, Y, Z and W in world space coordinates) to generate transformed coordinate data (e.g. X, Y, Z and W in screen space coordinates) for a particular viewport. The processing module 804 receives the untransformed coordinate data (e.g. X, Y, Z and W in world space coordinates) from the vertex data buffer 808 and receives an indication of the viewport to transform the coordinate data to.

In some cases, each possible viewport is associated with a set of coefficients which drive the ALUs to transform the untransformed coordinate data to that viewport. In these cases, the viewport transformation module 212 may comprise a coefficient storage module 810 that stores the coefficients for each possible viewport. In some cases, the coefficients along with their associated VPT ID may be received from the application 206 as part of state information and then stored in the coefficient storage module 810. The coefficients for a particular viewport are then selected from the coefficient storage module 810 via the VPT ID. In other words, the VPT ID acts as an index to the coefficient storage module 810. In these cases, when the untransformed coordinate data (e.g. X, Y, Z, W) is provided to the processing module 804 for processing the VPT ID associated with the viewport transformation to be performed is provided to the coefficient storage module 810 which causes the coefficient storage module 810 to provide the set of coefficients associated with the appropriate viewport to be provided to the processing module 804.

The processing module 804 is configured to perform one viewport transformation at a time and output transformed coordinate data (e.g. X, Y, Z and W in screen space coordinates). Since N transformations will be performed on the same untransformed coordinate data (e.g. X, Y, Z and W) the processing module 804 is said to perform N passes or iterations of that untransformed coordinate data. In some cases, the processing module 804 is configured to perform the viewport transformation based on the viewport associated with the current vertex in the first pass or iteration and perform the viewport transformations based on the viewport associated with the other vertices in the strip in the subsequent passes or iterations. As described below, in some cases the transformed coordinate data for the different passes or iterations is stored in the data store (e.g. vertex buffer 408) in a predetermined order to make it easier for the downstream components, such as the primitive build module 404, to subsequently fetch the transformed coordinate data from the data store (e.g. vertex buffer 408). In these cases, performing the viewport transformations in this order makes it easier for the viewport transformation module 212 (or the transaction processing module 402) to calculate the address of the data store (e.g. the vertex buffer 408) to which the transformed coordinate data is to be written. It will be evident to a person of skill in the art that this is an example only and that the viewport transformations may be performed in a different order. For example, in other cases the viewport transformations may be performed in viewport vertex order (i.e. the order that the vertices associated with the identified viewports are in the strip).

The write module 806 receives the transformed coordinate data (e.g. X, Y, Z and W in screen space coordinates) and writes the transformed coordinate data (e.g. X, Y, Z and W in screen space coordinates) to the data store (e.g. vertex buffer 408). In some cases, the write module 806 may be configured to write the transformed coordinate data to the data store (e.g. vertex buffer 408) such that the transformed coordinate data for the different viewports is stored in the data store (e.g. vertex buffer 408) in a particular order so that it is easier for downstream modules, such as the primitive build module 404, to retrieve the appropriate transformed coordinate data from the data store (e.g. vertex buffer 408).

For example, as described below with reference to FIGS. 12 to 13 the write module 806 may be configured to cause the transformed coordinate data (e.g. X, Y, Z and W in screen space coordinates) for a vertex to be stored in the data store (e.g. vertex buffer 408) in an order that corresponds to the order of the viewport vertices in the strip. For example, if the viewports associated with vertices 1, 2 and 3 are used for the viewport transformations and vertex 1 precedes vertex 2 in the strip, and vertex 2 precedes vertex 3 in the strip, then the transformed coordinate data (e.g. X, Y, Z and W in screen space coordinates) based on the viewport associated with vertex 1 may be stored in a first location (e.g. base address+0) in the data store (e.g. vertex buffer 408), the transformed coordinate data (e.g. X, Y, Z and W in screen space coordinates) based on the viewport associated with vertex 2 may be stored in the next location (e.g. base address+1) in the data store (e.g. vertex buffer 408), and the transformed coordinate data (e.g. X, Y, Z and W in screen space coordinates) based on viewport associated with vertex 3 may be stored in the further next location (e.g. base address+2) in the data store (e.g. vertex buffer 408).

In other words, the transformed coordinate data based on the different viewports can be understood as being stored in the data store (e.g. vertex buffer 408) at different offsets from a base address wherein the offset dictates the order of that transformed coordinate data in the data store. Where the transformed coordinate data is to be stored in the data store (e.g. vertex buffer 408) in an order corresponding to the order of the viewport vertices in the strip, the transformed coordinate data based on the viewport associated with the first viewport vertex in the strip may be written to a base address plus an offset of zero, the transformed coordinate data based on the viewport associated with the second viewport vertex in the strip may be written to a base address plus an offset of one, the transformed coordinate data based on the viewport associated with the third viewport vertex in the strip may be written to a base address plus an offset of two and so on.

In some examples, the transaction processing module 402 may be configured to determine the appropriate offset for each viewport transformation based on the ordering of the viewport vertices in the strip and transmit the determined offset(s) to the viewport transformation module 212 as part of the viewport transformation instruction(s). In other examples, the viewport transformation module 212 may itself be configured to determine the offset for each viewport transformation based on the ordering of the viewport vertices in the strip. In yet other examples, the transaction processing module 402 may be configured to provide information to the viewport transformation module 212 that allows the viewport transformation module 212 to determine the appropriate offset without having to determine the order of the viewport vertices in the strip.

For example, in some cases the transaction processing module 402 may be configured to cause the viewport transformation module 212 to perform the viewport transformations in a predetermined order and provide information, as part of the viewport transformation instruction(s), indicating which is the first viewport transformation, which is the second viewport transformation and so on. For example, the transaction processing module 402 may be configured to cause the viewport transformation module 212 to perform the viewport transformation corresponding to the viewport of the current vertex first and subsequently perform the viewport transformations corresponding to the viewports of the other vertices in order. The transaction processing module 402 may then include information in the viewport transformation instruction(s) associating each viewport transformation with an iteration or pass number. The viewport transformation module 212 can then use the pass or iteration information in conjunction with the provoking vertex to identify the offset to be used to store the transformed coordinate data for each viewport transformation.

For example, if the primitive is a triangle and the provoking vertex is the leading vertex then the viewport vertices will be the current vertex and the two vertices immediately preceding the current vertex. If during the first pass or iteration the viewport transformation module 212 is configured to perform the viewport transformation based on the viewport associated with the current vertex then this viewport transformation is related to the third viewport vertex in the strip and thus the associated transformed coordinate data should be stored in the third position (i.e. offset 2). If during the second and third passes or iterations the viewport transformation module 212 is configured to perform viewport transformations based on the viewport associated with the vertex that precedes the current vertex by two, and based on the viewport associated with the vertex that precedes the current vertex by one respectively then these viewport transformations are related to the first and second viewport vertices in the strip and thus the associated transformed coordinate data should be stored in the first and second positions (i.e. offsets 0 and 1) respectively. Therefore, if the provoking vertex is the leading vertex the viewport transformation module 212 may be configured to use offset 2 during the first iteration, offset 0 during the second iteration, and offset 1 during the third iteration.

Similarly, if the primitive is a triangle and the provoking vertex is the middle vertex then the viewport vertices will be the current vertex, the vertex immediately preceding the current vertex, and the vertex immediately following the current vertex in the strip. If during the first pass or iteration the viewport transformation module 212 is configured to perform the viewport transformation based on the viewport associated with the current vertex then this viewport transformation is related to the second viewport vertex in the strip and thus the associated transformed coordinate data should be stored in the second position (i.e. offset 1). If during the second and third passes or iterations the viewport transformation module 212 is configured to perform viewport transformations based on the viewport associated with the vertex that precedes the current vertex by one, and based on the viewport associated with the vertex that follows the current vertex by one then these viewport transformations are related to the first and third viewport vertices in the strip and thus the associated transformed coordinate data should be stored in the first and third positions (i.e. offsets 0 and 2) respectively. Therefore, if the provoking vertex is the middle vertex the viewport transformation module 212 may be configured to use offset 1 during the first iteration, offset 0 during the second iteration and offset 2 during the third iteration.

This is summarized in Table 2.

TABLE 2

| Provoking Vertex | Iteration 1 | Iteration 2 | Iteration 3 |
| --- | --- | --- | --- |
| Leading Vertex | Offset 2 | Offset 0 | Offset 1 |
| Middle Vertex | Offset 1 | Offset 0 | Offset 2 |
| Trailing Vertex | Offset 0 | Offset 1 | Offset 2 |

Figure 9:
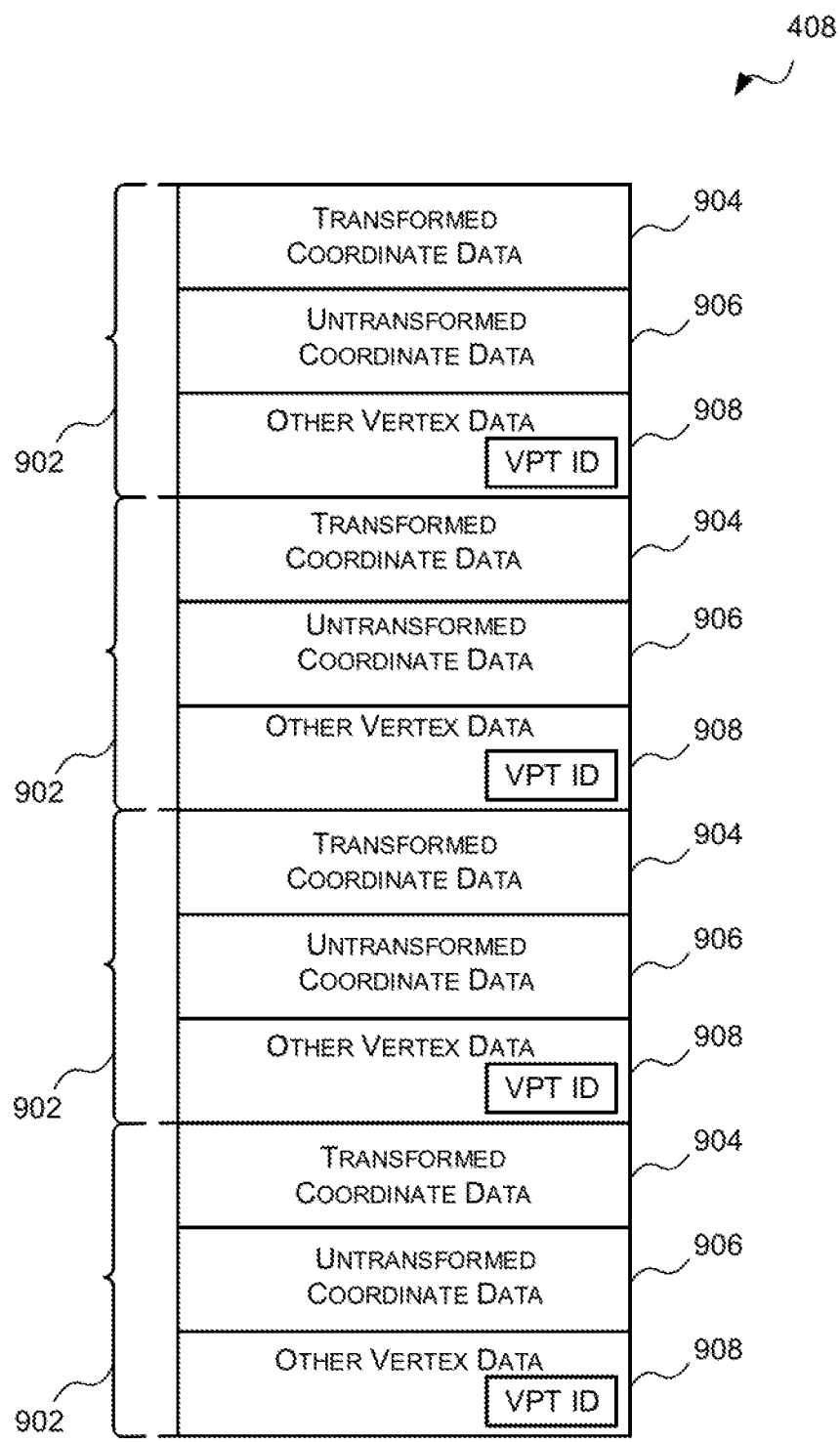
FIG. 9 is a schematic diagram of an example structure of the vertex buffer.

Reference is now made to FIG. 9 which is a block diagram showing an example structure of the vertex buffer 408. In the example of FIG. 9 the vertex buffer 408 is divided into a plurality of vertex blocks 902 wherein each vertex block 902 is configured to store vertex data, including transformed coordinate data and untransformed coordinate data, for a plurality of vertices. Each vertex block 902 is divided into a transformed coordinate data section 904, an untransformed coordinate data section 906, and an 'other' vertex data section 908. The transformed coordinate data section 904 is used to store the transformed coordinate data for the associated vertices, the untransformed coordinate data section 906 is used to store the untransformed coordinate data for the associated vertices, and the 'other' vertex data section 908 is configured to store other data related to the vertices such as the VPT ID associated with each vertex and other status information. Accordingly, the fetch module 802 of the viewport transformation module 212 is configured to read from the untransformed coordinate data section 906 and the write module 806 of the viewport transformation module 212 is configured to write to the transformed coordinate data section 904.

Reference is now made to FIG. 10 which illustrates an example structure of a vertex block 902 that is known to the application (which does not necessarily mean that the structure is well-known) which is configured to store untransformed and transformed coordinate data for a plurality of vertices which are viewport transformed in parallel. Each section 904, 906, 908 of the vertex block 902 comprises a number of rows and columns to hold the data associated with four vertices (numbered 0 to 3 in this example). In some examples, each column is 32 bits wide, however it will be evident to a person of skill in the art that this is an example only and that another number of bits may be used for the columns.

In this example, the untransformed coordinate data is written to the vertex buffer 408 in column order whereas the transformed coordinate data is written to the vertex buffer 408 in row order. For example, the untransformed coordinates (X0, Y0, Z0 and W0) related to a first vertex (e.g. vertex 0) are written in column 0 rows 5-8, and the untransformed coordinates (X1, Y1, Z1 and W1) for a second vertex (e.g. vertex 1) are written in column 1 rows 5-8; whereas the transformed coordinates (TX0, TY0, TZ0 and TW0) for the first vertex (e.g. vertex 0) are written in columns 3 to 0 of row 0 respectively, and the transformed coordinates (TX1, TY1, TZ1 and TW1) for the second vertex (e.g. vertex 1) are written in columns 3 to 0 of row 1 respectively. Testing has shown that in some PP blocks performance can be improved by storing the transformed coordinates in row order as opposed to column order.

The transformed coordinate data section 904 of FIG. 10 comprises four rows thus four sets of transformed coordinate data can be stored at one time. This allows the transformed coordinate data for one viewport transformation for each of the vertices to be stored. For example, the transformed coordinate data (TX0, TY0, TZ0, TW0) for the first vertex (vertex 0) may be stored in the first row (row 0); the transformed coordinate data (TX1, TY1, TZ1, TW1) for the second vertex (vertex 1) may be stored in the second row (row 1); the transformed coordinate data (TX2, TY2, TZ2, TW2) for the third vertex (vertex 2) may be stored in the third row (row 2); and the transformed coordinate data (TX3, TY3, TZ3, TW3) for the fourth vertex (vertex 3) may be stored in the fourth row (row 3).

Accordingly, the vertex block 902 structure shown in FIG. 10 is particularly useful in cases where there is a single viewport transformation performed on each vertex and these transformations can be performed in parallel. However, in the embodiments described herein multiple (i.e. N) transformations are performed on vertices and thus there is N times as much transformed coordinate data that needs to be stored. Accordingly, in the embodiments described herein the same vertex block 902 structure is used, but in a different manner. Specifically, instead of the transformed coordinate data section 904 being used to store transformed coordinate data for multiple vertices at a time, the transformed coordinate data section 904 is used to store multiple sets of transformed coordinate data for a single vertex at a time.

Reference is now made to FIG. 11 which illustrates how the vertex block 902 structure of FIG. 10 may be used in the embodiments described herein. Specifically, instead of the rows (e.g. rows 0 to 3) of the transformed coordinate data section 904 being used to store a single set of transformed coordinate data for multiple different vertices, the rows (e.g. rows 0 to 3) of the transformed coordinate data section 904 are used to store multiple sets of transformed coordinate data for the same vertex. For example, the transformed coordinate data (TX0.A, TY0.A, TZ0.A, TW0.A) for a first vertex (e.g. vertex 0) corresponding to a first viewport transformation (A) may be stored in the first row (e.g. row 0); the transformed coordinate data (TX0.B, TY0.B, TZ0.B, TW0.B) for the first vertex (e.g. vertex 0) corresponding to a second viewport transformation (B) may be stored in the second row (e.g. row 1); and the transformed coordinate data (TX0.C, TY0.C, TZ0.C, TW0.C) for the first vertex (e.g. vertex 0) corresponding to a third viewport transformation (C) may be stored in the third row (row 2).

The use of the transformed coordinate data section 904 of the vertex block 902 in this manner will result in the transformed coordinate data section 904 being reused or overwritten for each vertex in the vertex block 902. For example, the transformed coordinate data section 904 is written to first with the transformed coordinate data for the first vertex (e.g. vertex 0), next with the transformed coordinate data for the second vertex (e.g. vertex 1), next with the transformed coordinate data for the third vertex (e.g. vertex 2) and finally with the transformed coordinate data for the fourth vertex (e.g. vertex 3) in the vertex block 902. However, the use of the transformed coordinate data section 904 of the vertex block 902 in this manner allows the same amount of storage of the vertex buffer 408 to be used in the multi-viewport transformation cases as the parallel-single viewport transformation case.

As noted above, in some cases, the write module 806 is configured to store the transformed coordinate data corresponding to different viewports in a particular order in the data store (e.g. vertex buffer 408) to make it easier for a downstream component, such as the primitive build module, to retrieve the appropriate transformed coordinate data. Specifically, in some cases the write module 806 is configured to store the transformed coordinate data for the identified viewports in order (or reverse order) of the vertices associated with the identified viewports in the strip (e.g. triangle strip). For example, if the identified viewports (e.g. selected in accordance with the method 700 of FIG. 7) are associated with vertices 1, 2 and 3 where vertex 1 precedes 2 in the strip and vertex 2 precedes vertex 3 in the strip the transformed coordinate data based on the viewport associated with vertex 1 may be stored at a first offset (e.g. in row 2), the transformed coordinate data based on the viewport associated with vertex 2 may be stored at a second offset (e.g. in row 1) and the transformed coordinate data based on the viewport associated with vertex 3 may be stored at a third offset (e.g. in row 0).

Storing the transformed coordinate data in this order ensures that the transformed coordinate data corresponding to a vertex in a particular primitive position will always be at the same location (e.g. offset) of the data store (e.g. vertex buffer 408) regardless of the provoking vertex. For example, this may ensure that the transformed coordinate data for a vertex when that vertex is the leading vertex will always be at offset 0, the transformed coordinate data for a vertex when that vertex is the middle vertex will always be at offset 1, and the transformed coordinate data for a vertex when that vertex is the trailing vertex will be at offset 2. This means that, regardless of the provoking vertex, components downstream from the viewport transformation module 212, such as the primitive build module 404, will always be able to find the transformed coordinate data for a vertex in a particular primitive position in the same location of the data store (e.g. vertex buffer 408).

This will be explained with reference to FIG. 12 which shows an example triangle strip 1200 comprising five vertices 1202 (V-0 to V-4) and three primitives 1204 (P-A to P-C) formed thereby. If the provoking vertex is 0 (i.e. the provoking vertex is the leading vertex) then according to method 700 of FIG. 7 the viewports associated with the current vertex (i.e. the vertex to be transformed) and the two preceding vertices are to be used for the viewport transformations. For example, if vertex 2 (V-2) is the current vertex then the viewport associated with vertices 0 (V-0), 1 (V-1) and 2 (V-2) are used for the viewport transformations of the untransformed coordinate data for vertex 2 (V-2). If the transformed coordinate data for vertex 2 (V-2) is stored in order of the viewport vertices then as shown in table 1206 the transformed coordinate data (TX2.0, TY2.0, TZ2.0 and TW2.0) based on the viewport associated with vertex 0 is stored in row 0, the transformed coordinate data (TX2.1, TY2.1, TZ2.1 and TW2.1) based on the viewport associated with vertex 1 is stored in row 1, and the transformed coordinate data (TX2.2, TY2.2, TZ2.2 and TW2.2) based on the viewport associated with vertex 2 is stored in row 2. This means that the transformed coordinate data corresponding to vertex 2 as a trailing vertex (e.g. when part of primitive A) is in row 0, the transformed coordinate data corresponding to vertex 2 as a middle vertex (e.g. when part of primitive B) is in row 1, and the transformed coordinate data corresponding to vertex 2 as a leading vertex (e.g. when part of primitive C) is in row 2.

If the provoking vertex is 1 (i.e. the provoking vertex is the middle vertex) then according to method 700 of FIG. 7 the viewports associated with the current vertex (i.e. the vertex to be transformed), the vertex preceding the current vertex, and the vertex following the current vertex are to be used for the viewport transformations. For example, if vertex 2 (V-2) is the current vertex then the viewport associated with vertices 1 (V-1), 2 (V-2) and 3 (V-3) are used for the viewport transformations of the untransformed coordinate data for vertex 2 (V-2). If the transformed coordinate data for vertex 2 (V-2) is stored in order of the viewport vertices then as shown in table 1208 the transformed coordinate data (TX2.1, TY2.1, TZ2.1 and TW2.1) based on the viewport associated with vertex 1 is stored in row 0, the transformed coordinate data (TX2.2, TY2.2, TZ2.2 and TW2.2) based on the viewport associated with vertex 2 is stored in row 1, and the transformed coordinate data (TX2.3, TY2.3, TZ2.3 and TW2.3) based on the viewport associated with vertex 3 is stored in row 2. This means that the transformed coordinate data corresponding to vertex 2 as a trailing vertex (e.g. when part of primitive A) is in row 0, the transformed coordinate data corresponding to vertex 2 as a middle vertex (e.g. when part of primitive B) is in row 1, and the transformed coordinate data corresponding to vertex 2 as a leading vertex (e.g. when part of primitive C) is in row 2.

If the provoking vertex is 2 (i.e. the provoking vertex is the trailing vertex) then according to method 700 of FIG. 7 the viewports associated with the current vertex (i.e. the vertex to be transformed), and the two vertices following the current vertex are to be used for the viewport transformations. For example, if vertex 2 (V-2) is the current vertex then the viewports associated with vertices 2 (V-2), 3 (V-3) and 4 (V-4) are used for the viewport transformations of the untransformed coordinate data for vertex 2 (V-2). If the transformed coordinate data for vertex 2 (V-2) is stored in order of the viewport vertices then as shown in table 1210 the transformed coordinate data (TX2.2, TY2.2, TZ2.2 and TW2.2) based on the viewport associated with vertex 2 is stored in row 0, the transformed coordinate data (TX2.3, TY2.3, TZ2.3 and TW2.3) based on the viewport associated with vertex 3 is stored in row 1, and the transformed coordinate data (TX2.4, TY2.4, TZ2.4 and TW2.4) based on the viewport associated with vertex 4 is stored in row 2. This means that the transformed coordinate data corresponding to vertex 2 as a trailing vertex (e.g. when part of primitive A) is in row 0, the transformed coordinate data corresponding to vertex 2 as a middle vertex (e.g. when part of primitive B) is in row 1, and the transformed coordinate data corresponding to vertex 2 as a leading vertex (e.g. when part of primitive C) is in row 2.

Accordingly, by storing the transformed coordinate data for a vertex in order of the viewport vertices the transformed coordinate data for a vertex corresponding to the vertex in a particular primitive position will be found in the same location (e.g. row) of the data store (e.g. vertex buffer 408) regardless (or independent) of the provoking vertex. This allows downstream components, such as, the primitive build module, to always retrieve the transformed coordinate data for the vertex in a particular primitive position from the same location (e.g. row) of the data store (e.g. vertex buffer 408) thus simplifying the read logic in the downstream component(s) Since there are typically more reads of transformed coordinate data then writes of transformed coordinate data performance benefits can be seen by adding the complexity in the write side as opposed to the read side.

Figure 13:
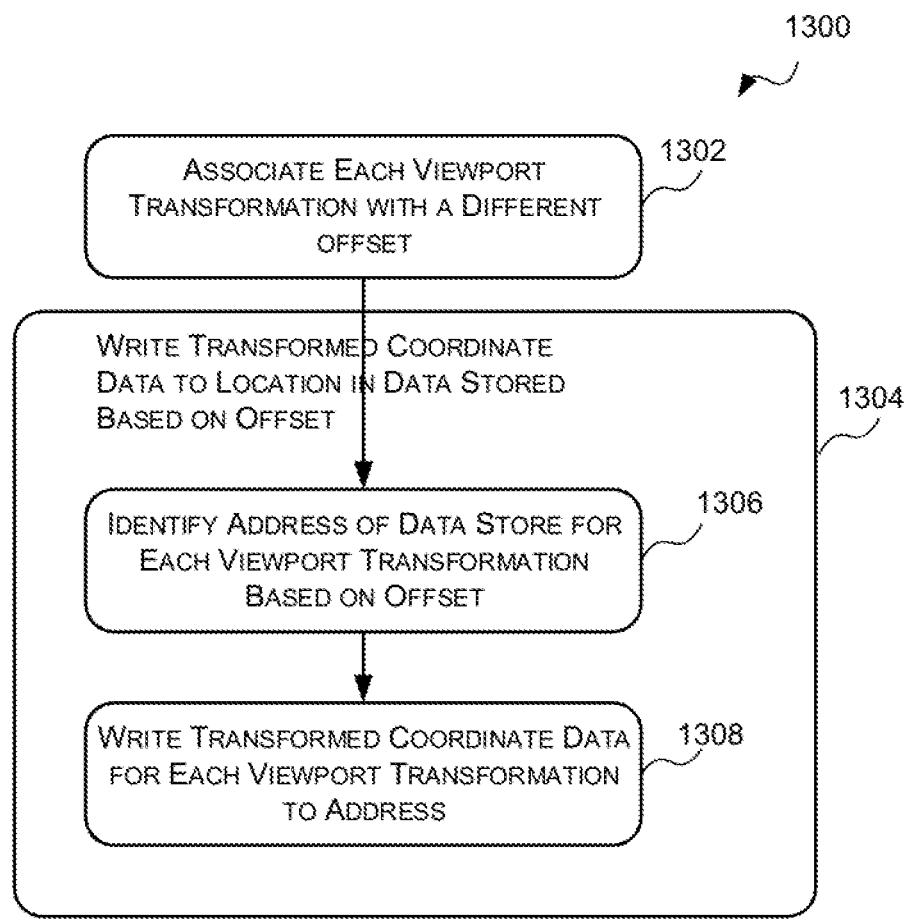
FIG. 13 is a flow diagram of an example method for writing transformed coordinate data to a data store.

Reference is now made to FIG. 13 which illustrates an example method 1300 for writing the transformed coordinate data to the data store (e.g. vertex buffer 308) so that the transformed coordinate data is stored in an order corresponding to an order of the viewport vertices in the strip (i.e. an order corresponding to an order of the vertices in the strip associated with the plurality of viewports).

The method begins at block 1302 (after the viewport transformation module 212 (e.g. processing module 804) has performed a viewport transformation on untransformed coordinate data for a vertex in a strip for each of a plurality of viewports to generate transformed coordinate data for each of the plurality of viewports as described above) where the viewport transformation module 212 (e.g. the write module 806) associates each viewport transformation with a different offset representing the order of the vertex associated with the corresponding viewport in the strip. For example, as described above, if the identified viewports are associated with vertices 1, 2 and 3 where vertex 1 precedes 2 in the strip and vertex 2 precedes vertex 3 in the strip the viewport transformation (and thus the transformed coordinate data) based on the viewport associated with vertex 1 may be associated with a first offset (e.g. offset 0), the viewport transformation (and thus the transformed coordinate data) based on the viewport associated with vertex 2 may be associated with a second offset (e.g. offset 1), and the viewport transformation (and thus the transformed coordinate data) based on the viewport associated with vertex 3 may be associated with a third offset (e.g. offset 2). Once the offsets have been associated with the viewport transformations then the method 1300 proceeds to block 1304.

At block 1304 the transformed coordinate data for each viewport transformation is stored in a separate location in the data store (e.g. vertex buffer 408) based on the offset associated with that viewport transformation. In some examples, writing the transformed coordinate data for each viewport transformation to a separate location in the vertex buffer may comprise at block 1306 determining an address of the vertex buffer for each viewport transformation based on a base address associated with the vertex and the offset associated with that viewport transformation. For example, the address may be the base address plus the offset. Then at block 1308 the transformed coordinate data for each viewport transformation is written to the address of the vertex buffer determined for that viewport transformation.

Figure 12:
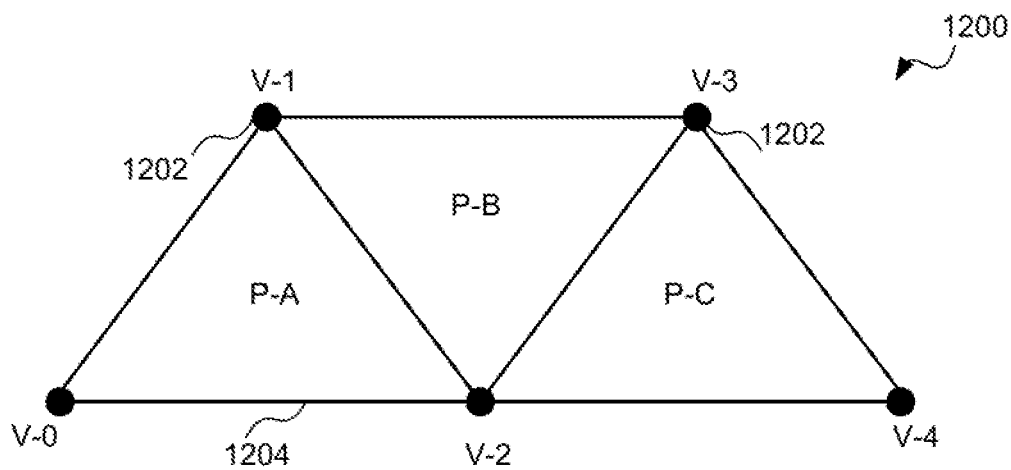
FIG. 12 is a schematic diagram illustrating an example of storing transformed coordinate data in viewport vertex order.

As described above, in some cases the offset may correspond to a particular row in the data store (e.g. vertex buffer 408) such that writing the transformed coordinate data to the vertex buffer comprises writing the transformed coordinate data for each viewport transformation to a different row of the vertex buffer (see, for example, FIGS. 11 and 12 and associated description thereof above). Also, as described above in reference to FIGS. 11 and 12 where the transformed coordinate data comprises transformed data for each of a plurality of coordinates (e.g. X, Y, Z and W) each coordinate may be written to a different column of the data store (e.g. vertex buffer).

In some cases, the viewport transformations may be performed in a predetermined order. For example, the viewport transformation corresponding to the viewport of the current vertex may be performed first and the viewport transformations corresponding to the viewports of the other vertices may be subsequently performed in order of those vertices in the strip. In these cases, each viewport transformation for a vertex is associated with an iteration number/identifier that indicates the order of the viewport transformation compared to the other viewport transformations for that vertex. For example, the first viewport transformation performed may be associated with a first iteration number, the second viewport transformation performed may be associated with a second iteration number and so on The iteration number in conjunction with the provoking vertex may then be used to determine which offset is associated with each viewport transformation.

For example, where the primitive is a triangle formed by a leading vertex, a middle vertex and a trailing vertex and the viewport transformation are performed in the order described above then the viewport transformations may be associated with the offsets as set out in Table 2 based on the iteration number and provoking vertex. For example, the viewport transformation performed in the first iteration may be associated with a third offset when the provoking vertex is the leading vertex, the viewport transformation performed in the first iteration may be associated with a second offset when the provoking vertex is the middle vertex, and the viewport transformation performed in the first iteration may be associated with a first offset when the provoking vertex is the trailing vertex.

As described above, storing the transformed coordinate data in the vertex buffer in an order that corresponds to an order of the vertices in the strip associated with the viewports ensures that the viewport transformations corresponding to the vertex in each primitive position are stored in the same location respectively in the data store (e.g. vertex buffer 408) regardless of the provoking vertex. For example, the transformed coordinate data corresponding to the viewport transformation for the current vertex as a trailing vertex may always be stored in row 0 of the data store (e.g. vertex buffer 408), the transformed coordinate data corresponding to the viewport transformation for the current vertex as a middle vertex may be stored in row 1 of the data store (e.g. vertex buffer 408), and the transformed coordinate data corresponding to the viewport transformation for the current vertex as a leading vertex may be stored in row 2 of the data store (e.g. vertex buffer 408).

Although FIG. 13 illustrates a method in which all viewport transformations are performed on the untransformed coordinate data and then all of the transformed coordinate data sets are written to the data store (e.g. vertex buffer 408), in other examples the viewport transformation module 212 may be configured to write the transformed coordinate data for a particular viewport transformation to the data store (e.g. vertex buffer 408) as soon as that transformed coordinate data is available instead of waiting for all viewport transformations to be complete.

Figure 14:
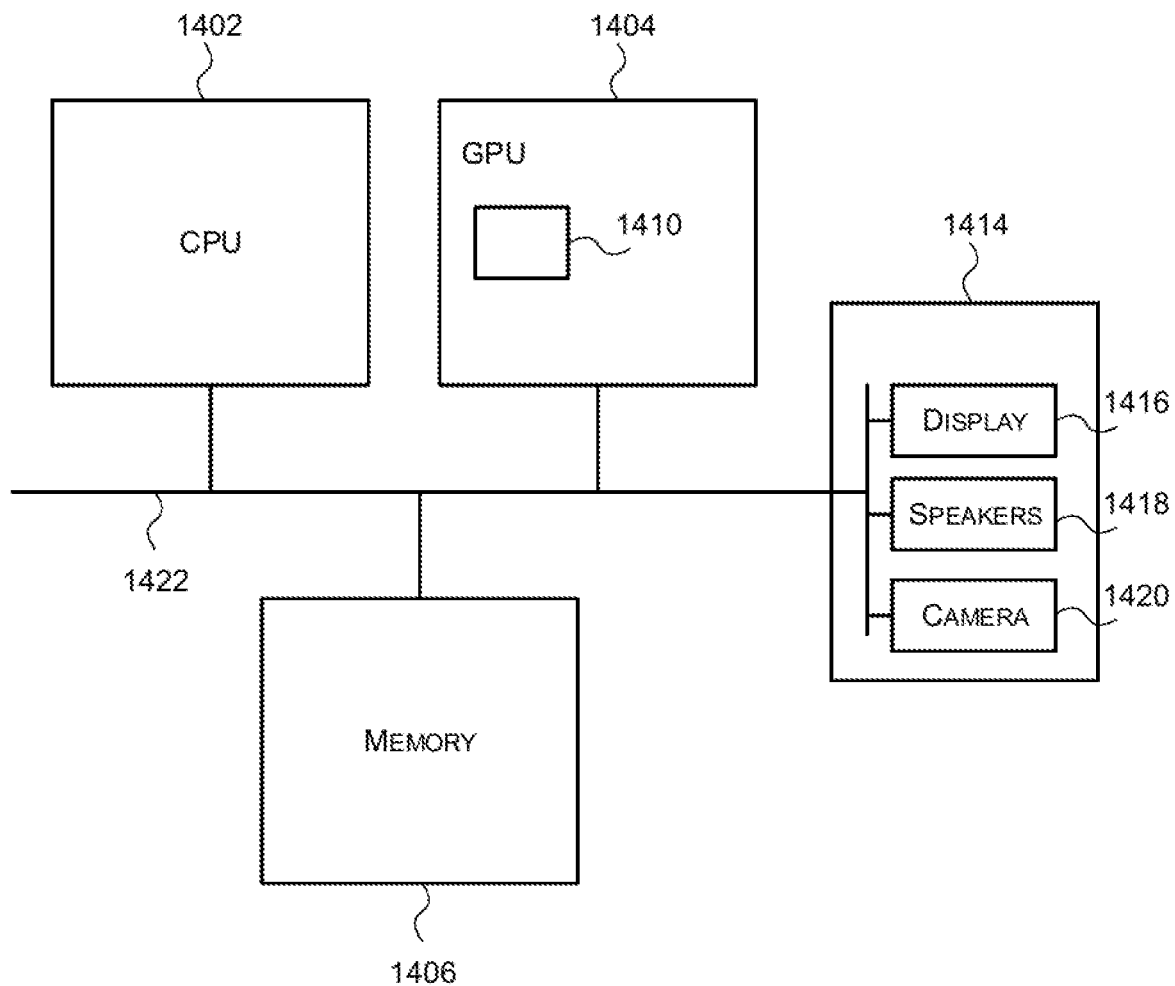
FIG. 14 is a block diagram of an example computer system in which the viewport transformation module described herein is implemented.

FIG. 14 shows a computer system in which the viewport transformation modules described herein may be implemented. The computer system comprises a CPU 1402, a GPU 1404, a memory 1406 and other devices 1414, such as a display 1416, speakers 1418 and a camera 1420. A viewport transformation module 1410 (corresponding to the viewport transformation module 212 described herein) is shown implemented within the GPU 1404. In other examples, the viewport transformation module 1410 may be implemented within the CPU 1402. The components of the computer system can communicate with each other via a communications bus 1422.

The PP blocks 210 and viewport transformation modules 212 of FIGS. 4 and 8 are shown as comprising a number of functional blocks. This is schematic only and is not intended to define a strict division between different logic elements of such entities. Each functional block may be provided in any suitable manner. It is to be understood that intermediate values described herein as being formed by a PP block 210 or viewport transformation module 212 need not be physically generated by the PP block 210 or the viewport transformation module 212 at any point and may merely represent logical values which conveniently describe the processing performed by the PP block 210 or the viewport transformation module 212 between its input and output.

The viewport transformation module 212 or PP block 210 described herein may be embodied in hardware on an integrated circuit. The viewport transformation modules and PP blocks 210 described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture a processor configured to perform any of the methods described herein, or to manufacture a processor comprising any apparatus described herein. An integrated circuit definition dataset may be, for example, an integrated circuit description.

There may be provided a method of manufacturing, at an integrated circuit manufacturing system, a viewport transformation module 212 or PP block 210 as described herein. There may be provided an integrated circuit definition dataset that, when processed in an integrated circuit manufacturing system, causes the method of manufacturing a viewport transformation module 212 or PP block 210 to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a viewport transformation module 212 will now be described with respect to FIG. 15.

Figure 15:
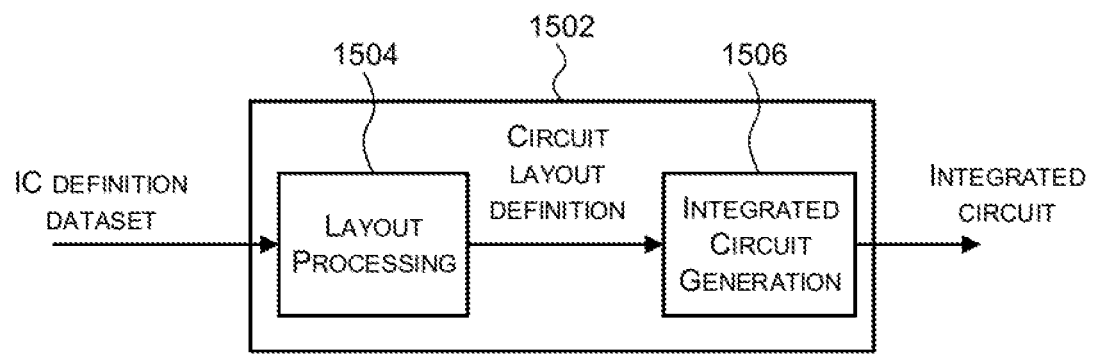
FIG. 15 is a block diagram of an example integrated circuit manufacturing system for generating an integrated circuit embodying a system to implement the viewport transformation module described herein.

FIG. 15 shows an example of an integrated circuit (IC) manufacturing system 1502 which is configured to manufacture a viewport transformation module as described in any of the examples herein. In particular, the IC manufacturing system 1502 comprises a layout processing system 1504 and an integrated circuit generation system 1506. The IC manufacturing system 1502 is configured to receive an IC definition dataset (e.g. defining a viewport transformation module 212 as described in any of the examples herein), process the IC definition dataset, and generate an IC according to the IC definition dataset (e.g. which embodies a viewport transformation module 212 as described in any of the examples herein). The processing of the IC definition dataset configures the IC manufacturing system 1502 to manufacture an integrated circuit embodying a viewport transformation module as described in any of the examples herein.

The layout processing system 1504 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1504 has determined the circuit layout it may output a circuit layout definition to the IC generation system 1506. A circuit layout definition may be, for example, a circuit layout description.

The IC generation system 1506 generates an IC according to the circuit layout definition, as is known in the art. For example, the IC generation system 1506 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1506 may be in the form of computer-readable code which the IC generation system 1506 can use to form a suitable mask for use in generating an IC.

The different processes performed by the IC manufacturing system 1502 may be implemented all in one location, e.g. by one party. Alternatively, the IC manufacturing system 1502 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a viewport transformation module 212 without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 15 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 15, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A viewport transformation module for use in a three-dimensional rendering system, the viewport transformation module comprising:
 a processing module configured to perform a viewport transformation on untransformed coordinate data for a particular vertex in a strip for each of a plurality of viewports to generate transformed coordinate data for each of the plurality of viewports, the plurality of viewports comprising a viewport associated with the particular vertex and a viewport associated with at least one other vertex in the strip, the at least one other vertex selected based on a provoking vertex of primitives to be formed by vertices in the strip and a number of vertices in each primitive; and
 a write module configured to write the transformed coordinate data to a vertex buffer;
 wherein the viewport transformation module is configured to perform the viewport transformations prior to at least one of the primitives being built from the vertices in the strip.

2. The viewport transformation module of claim 1, further comprising:
 a fetch module configured to read from the vertex buffer:
  the untransformed coordinate data for the particular vertex;
  information identifying the viewport associated with the particular vertex; and
  information identifying the viewport associated with the at least one other vertex in the strip.

3. The viewport transformation module of claim 1, wherein the at least one other vertex comprises N−1 other vertices where N is the number of vertices in each primitive.

4. The viewport transformation module of claim 1, wherein each primitive is a triangle comprising a leading vertex, a middle vertex and a trailing vertex, and the at least one other vertex in the strip is selected from two vertices immediately preceding the particular vertex in the strip and two vertices immediately following the particular vertex in the strip.

5. The viewport transformation module of claim 4, wherein:
 when the provoking vertex is the leading vertex, the at least one other vertex in the strip comprises the two vertices immediately preceding the particular vertex in the strip;
 when the provoking vertex is the middle vertex, the at least one other vertex in the strip comprises a vertex immediately preceding the particular vertex in the strip and a vertex immediately following the particular vertex in the strip; and
 when the provoking vertex is the trailing vertex, the at least one other vertex in the strip comprises the two vertices immediately following the particular vertex in the strip.

6. The viewport transformation module of claim 1, wherein the write module is configured to write the transformed coordinate data to the vertex buffer so that the transformed coordinate data for each of the plurality of viewports is stored in the vertex buffer in an order that corresponds to an order of the vertices in the strip associated with the plurality of viewports.

7. The viewport transformation module of claim 6, wherein the write module is configured to write the transformed coordinate data for each of the plurality of viewports to the vertex buffer in an order that corresponds to the order of the vertices in the strip associated with the plurality of viewports by associating each viewport transformation with a different offset representing the order of the vertices associated with the corresponding viewports in the strip, and writing the transformed coordinate data for each viewport transformation to a separate location in the vertex buffer based on the offset associated with that viewport transformation.

8. The viewport transformation module of claim 7, wherein the separate location in the vertex buffer to which the transformed coordinate data for each viewport transformation is written is identified by an address of the vertex buffer that is based on a base address associated with the particular vertex and the offset associated with that viewport transformation.

9. The viewport transformation module of claim 8, wherein each offset corresponds to a particular row of the vertex buffer, and the transformed coordinate data comprises transformed data for each of a plurality of coordinates and the transformed data for each of the plurality of coordinates is written to a different column of the vertex buffer.

10. The viewport transformation module of claim 7, wherein each viewport transformation performed on the untransformed coordinate data is associated with an iteration identifier that identifies an order of that viewport transformation relative to the other viewport transformations performed on the untransformed coordinate data; and the offset associated with each viewport transformation is based on the iteration identifier associated with that viewport transformation and the provoking vertex.

11. The viewport transformation module of claim 10, wherein the processing module is configured to perform each viewport transformation in response to receiving a viewport transformation instruction from a transaction processing module, the viewport transformation instruction specifying the particular vertex and the iteration identifier associated with that viewport transformation.

12. The viewport transformation module of claim 7, wherein
each primitive is a triangle formed by a leading vertex, a middle vertex and a trailing vertex and the processing module is configured to perform the viewport transformation based on the viewport associated with the particular vertex in a first iteration and to perform the viewport transformation based on the viewport associated with the at least one other vertex in one or more subsequent iterations; and
the write module is configured to associate the viewport transformation performed in the first iteration with a third offset when the provoking vertex is the leading vertex, associate the viewport transformation performed in the first iteration with a second offset when the provoking vertex is the middle vertex, and associate the viewport transformation performed in the first iteration with a first offset when the provoking vertex is the trailing vertex.

13. The viewport transformation module of claim 7, wherein each primitive is a triangle formed by a leading vertex, a middle vertex and a trailing vertex, and one viewport transformation performed on the untransformed coordinate data corresponds to a viewport transformation for the particular vertex as the leading vertex in a primitive, one viewport transformation performed on the untransformed coordinate data corresponds to a viewport transformation for the particular vertex as the middle vertex in a primitive, and one viewport transformation performed on the untransformed coordinate data corresponds to a viewport transformation for the particular vertex as the trailing vertex in a primitive; and
the write module is configured to associate the viewport transformation that corresponds to the viewport transformation for the particular vertex as the leading vertex in a primitive with a third offset, associate the viewport transformation that corresponds to the viewport transformation for the particular vertex as the middle vertex of a primitive with a second offset, and associated the viewport transformation that corresponds to the viewport transformation for the particular vertex as the trailing vertex of a primitive with a first offset.

14. The viewport transformation module of claim 1, wherein each primitive is a triangle formed by a leading vertex, a middle vertex and a trailing vertex, and one viewport transformation performed on the untransformed coordinate data corresponds to a viewport transformation for the particular vertex as the leading vertex in a primitive, one viewport transformation performed on the untransformed coordinate data corresponds to a viewport transformation for the particular vertex as the middle vertex in a primitive, and one viewport transformation performed on the untransformed coordinate data corresponds to a viewport transformation for the particular vertex as the trailing vertex in a primitive.

15. The viewport transformation module of claim 1, wherein
the processing module is further configured to perform a viewport transformation on untransformed coordinate data for a second vertex in a second strip for each of a second plurality of viewports to generate transformed coordinate data for each of the second plurality of viewports; and
the write module is configured to write the transformed coordinate data for the second vertex to a same location of the vertex buffer as the transformed coordinate data for the particular vertex.

16. The viewport transformation module of claim 1, wherein the viewport transformation module is embodied in hardware on an integrated circuit.

17. A three-dimensional rendering system comprising the viewport transformation module as set forth in claim 1.

18. A non-transitory computer readable storage medium having stored thereon a computer readable description of the viewport transformation module as set forth in claim 1 that, when processed in an integrated circuit manufacturing system, causes the integrated circuit manufacturing system to manufacture an integrated circuit embodying the viewport transformation module.

19. A method of performing multi-viewport transformations on vertices in a strip comprising:
performing a viewport transformation on untransformed coordinate data for a particular vertex in the strip for each of a plurality of viewports to generate transformed coordinate data for each of the plurality of viewports, the plurality of viewports comprising a viewport associated with the particular vertex and a viewport associated with at least one other vertex in the strip, the at least one other vertex selected based on a provoking vertex of primitives to be formed by the vertices in the strip and a number of vertices in each primitive; and
writing the transformed coordinate data to a vertex buffer;
wherein the viewport transformations are performed prior to at least one of the primitives being built from the vertices in the strip.

* * * * *